(12) United States Patent
Shimizu et al.

(10) Patent No.: US 9,529,323 B2
(45) Date of Patent: Dec. 27, 2016

(54) VIDEO DISPLAY DEVICE, HEAD-MOUNTED DISPLAY AND HEAD-UP DISPLAY

(75) Inventors: Yoshie Shimizu, Tokyo (JP); Yasushi Tanijiri, Tokyo (JP)

(73) Assignee: KONICA MINOLTA ADVANCED LAYERS, INC., Tokyo (JP)

( * ) Notice: Subject to any disclaimer, the term of this patent is extended or adjusted under 35 U.S.C. 154(b) by 508 days.

(21) Appl. No.: 13/702,957

(22) PCT Filed: May 30, 2011

(86) PCT No.: PCT/JP2011/062333
§ 371 (c)(1),
(2), (4) Date: Dec. 7, 2012

(87) PCT Pub. No.: WO2011/155357
PCT Pub. Date: Dec. 15, 2011

(65) Prior Publication Data
US 2013/0141527 A1    Jun. 6, 2013

(30) Foreign Application Priority Data

Jun. 7, 2010  (JP) .................................. 2010-129551
Jun. 30, 2010 (JP) .................................. 2010-149678

(51) Int. Cl.
*G02B 5/32* (2006.01)
*G03H 1/00* (2006.01)
(Continued)

(52) U.S. Cl.
CPC .............. *G03H 1/0005* (2013.01); *G02B 5/32* (2013.01); *G02B 27/0103* (2013.01);
(Continued)

(58) Field of Classification Search
CPC .................... G02B 5/0252; G02B 2027/0174; G02B 27/145; G02B 27/143
(Continued)

(56) References Cited

U.S. PATENT DOCUMENTS 5,589,956 A * 12/1996 Morishima et al. ............ 359/15
5,917,459 A *  6/1999 Son ..................... G02B 27/0103
                                                  340/980
(Continued)

FOREIGN PATENT DOCUMENTS

JP          06-051239        2/1994
JP          11-326824       11/1999
(Continued)

*Primary Examiner* — Audrey Y Chang
(74) *Attorney, Agent, or Firm* — Cozen O'Connor

(57) ABSTRACT

A video display device is provided with a light source, a display element, and an eyepiece optical system (14). The light source emits light which has at least one emission peak wavelength and has a wavelength width including one emission peak wavelength. The display element modulates the light emitted from the light source and displays video. The eye-piece optical system (14) comprises a volume phase reflective HOE (23) with diffracts and reflects video light from the display element and leads the light to a viewing pupil. An HOE surface (23a) is divided into a plurality of flat surfaces (31, 32, 33) disposed so as to be recessed on the viewing pupil side, and the plurality of flat surfaces (31, 32, 33) are continuous so as to have a common ridge line at a boundary between the flat surfaces adjoining to each other.

17 Claims, 18 Drawing Sheets

(51) Int. Cl.
*G02B 27/14* (2006.01)
*G02B 27/01* (2006.01)

(52) U.S. Cl.
CPC ....... *G02B 27/017* (2013.01); *G02B 27/0172* (2013.01); *G02B 27/143* (2013.01); *G02B 27/145* (2013.01); *G02B 2027/013* (2013.01); *G02B 2027/0116* (2013.01); *G02B 2027/0123* (2013.01); *G02B 2027/0174* (2013.01); *G02B 2027/0178* (2013.01)

(58) Field of Classification Search
USPC .. 359/15, 13, 632, 574, 630, 34; 345/8, 7, 9
See application file for complete search history.

(56) References Cited

U.S. PATENT DOCUMENTS

| | | | |
|---|---|---|---|
| 6,137,602 A | 10/2000 | Mukawa | |
| 2010/0149073 A1* | 6/2010 | Chaum et al. | 345/8 |

FOREIGN PATENT DOCUMENTS

| | | |
|---|---|---|
| JP | 2000-019449 | 1/2000 |
| JP | 2000-292737 | 10/2000 |

* cited by examiner

DURING EXPOSURE
(EXPOSURE WAVELENGTH; $\lambda r$)

DURING RECONSTRUCTION
(RECONSTRUCTION WAVELENGTH; $\lambda c$)

VIDEO DISPLAY DEVICE, HEAD-MOUNTED DISPLAY AND HEAD-UP DISPLAY

RELATED APPLICATIONS

This is a U.S. National Phase Application under 35 USC 371 of International Application PCT/JP2011/062333 filed on May 30, 2011.

This application claims the priority of Japanese application no. 2010-129551 filed Jun. 7, 2010 and JP 2010-149678 filed Jun. 30, 2010, the entire content of both of which are hereby incorporated by reference.

TECHNICAL FIELD

The present invention relates to video display devices which allow an observer to observe as a virtual image an image displayed on a display element, and to head-mount displays (hereinafter also referred to as HMDs) and head-up displays (hereinafter also referred to as HUDs) provided with such video display devices.

BACKGROUND ART

There have conventionally been proposed various types of video display device that employ a holographic optical element (hereinafter also referred to as HOE) to allow an observer to observe as a virtual image the image displayed on a display element. For example, in the video display device disclosed in Patent Document 1 listed below, a plurality of HOEs corresponding to a plurality of display elements are arranged in an array on the same plane so that the image light from those display elements are diffraction-reflected by the corresponding HOEs so as to be directed to the observer's pupil. This permits the observer to observe a large high-definition image.

On the other hand, in the video display device disclosed in Patent Document 2 listed below, in a configuration where the image light from a display element is diffraction-reflected by an HOE so as to be directed to the observer's pupil, the HOE is formed in a cylindrical shape. That is, the HOE is formed on a cylindrically shaped substrate, and thus the HOE surface as a whole is a cylindrical surface having a constant curvature.

Inconveniently, with the configuration of Patent Document 1, where a plurality of HOEs are arranged in an array on the same plane, as the observation angle of view increases, the diffraction angle of the image light on the HOE varies greatly within the image area. That is, the diffraction angle on the HOE (in particular, the difference between the diffraction angle and the regular reflection angle) becomes larger in end parts of the angle of view than at the center of the angle of view. As a result, with a configuration where a light source, such as an LED, that emits light with a light emission wavelength width is used and a display element modulates the light from that light source to display an image, dispersion on the HOE produces large lateral chromatic aberration in a part where the diffraction angle is large (in end parts of the angle of view). This diminishes resolution and degrades image quality.

In this respect, according to Patent Document 2, forming the HOE surface as a cylindrical surface makes it possible to reduce the diffraction angle (make it closer to the regular reflection angle) in end parts of the angle of view even in a wide-angle-of-view configuration. Thus, it is possible to reduce the above-mentioned aberration occurring when the HOE surface is a flat surface, and to allow observation of a satisfactory virtual image.

LIST OF CITATIONS

Patent Literature

Patent Document 1: Japanese Patent Application Publication No. H6-51239 (see claim 3, paragraphs [0012] and [0019], FIG. 1, etc.)
Patent Document 2: Japanese Patent Application Publication No. H11-326824 (see claims 1-3, paragraphs [0004]-[0006], [0018], [0019], and [0046], etc.)

SUMMARY OF INVENTION

Problem to be Solved by the Invention

However, with the configuration of Patent Document 2, where the entire HOE surface is formed as a cylindrical surface, when a wider angle of view is sought, the diffraction angle in end parts of the angle of view needs to be made closer to the regular reflection angle, and this requires that the curvature of the HOE be increased. Increasing the curvature of the HOE surface results in increasing the amount of protrusion of the entire HOE surface (making it protrude farther) to its convex side. This inconveniently increases the thickness, as perceived when the observation optical system (eyepiece optical system) including the HOE is arranged in front of the observer's eye, of the observation optical system (its thickness in the direction perpendicular to the plane of the observation pupil) including the HOE.

Devised to overcome the inconveniences mentioned above, the present invention aims to provide a video display device that permits a wider angle of view to be sought without increasing the thickness of an observation optical system including an HOE and that keeps lateral chromatic aberration resulting from dispersion on the HOE small to allow the observer to observe a high-definition image, and to provide an HMD and an HUD provided with such a video display device.

Means to Solve the Problem

A video display device according to the invention is provided with: a light source which emits light that has at least one light emission peak wavelength and has a wavelength width including one light emission peak wavelength; a display element which displays an image by modulating the light emitted from the light source; and an observation optical system which directs the light from the display element to an observation pupil to allow an observer to observe a virtual image at the position of the observation pupil. The observation optical system has a volume-phase reflective holographic optical element which diffraction-reflects the image light from the display element to direct it to the observation pupil. The surface of the holographic optical element is divided into a plurality of flat faces that are so arranged as to be concave toward the observation pupil. The plurality of flat faces are contiguous such that every two adjoining flat faces have a common ridge line at a boundary therebetween.

In the video display device according to the invention, the surface of the holographic optical element may be divided into the plurality of flat faces only in one direction.

In the video display device according to the invention, the surface of the holographic optical element may be divided into the plurality of flat faces only in, of two directions with different angle of views, the one with the wider angle of view.

In the video display device according to the invention, the surface of the holographic optical element may be divided into the plurality of flat faces in two directions.

In the video display device according to the invention, the observation optical system may include a substrate on which the holographic optical element is formed, and the substrate may be a plate-form substrate having a constant thickness in the direction perpendicular to the surface of the holographic optical element.

In the video display device according to the invention, when the axis that optically connects the center of the display surface of the display element to the center of the observation pupil is the optical axis, and the plane that includes the optical axes of both incident and emergent light with respect to the holographic optical element is a principal plane, the surface of the holographic optical element may be symmetric about the principal plane as the plane of symmetry and be divided into the plurality of flat faces only in the direction parallel to the principal plane. The substrate may hold the holographic optical element such that the order-0 diffraction light produced on the flat faces of the holographic optical element deviates from the optical path toward the observation pupil.

In the video display device according to the invention, preferably, the effective regions on the holographic optical element corresponding to the flat faces are formed away from each other across the ridge line between the flat faces.

A video display device according to the invention is provided with: a light source which emits light that has at least one light emission peak wavelength and has a wavelength width including one light emission peak wavelength; a display element which displays an image by modulating the light emitted from the light source; and an observation optical system which directs the light from the display element to an observation pupil to allow an observer to observe a virtual image at the position of the observation pupil. The observation optical system has a volume-phase reflective holographic optical element which diffraction-reflects the image light from the display element to direct it to the observation pupil. The surface of the holographic optical element is composed of a surface in which a curved face having a curvature only in one direction and concave toward the observation pupil is contiguous with a tangent flat face tangent to the curved face.

In the video display device according to the invention, when the axis that optically connects the center of the display surface of the display element to the center of the observation pupil is the optical axis, and the plane that includes the optical axes of both incident and emergent light with respect to the holographic optical element is the principal plane, the surface of the holographic optical element may be symmetric about the principal plane as the plane of symmetry. The tangent flat face may be arranged so as to cross the principal plane. The curved face may have the curvature in the direction perpendicular to the principal plane and be arranged one at each side of the tangent flat face in the direction perpendicular to the principal plane.

In the video display device according to the invention, when the axis that optically connects the center of the display surface of the display element to the center of the observation pupil is the optical axis, and the plane that includes optical axes of both incident and emergent light with respect to the holographic optical element is the principal plane, the surface of the holographic optical element may be symmetric about the principal plane as the plane of symmetry. The curved face may be arranged so that the curved face has the curvature in a the plane parallel to the principal plane. The tangent flat face may be arranged closer than the curved face to the display element.

In the video display device according to the invention, the curved face may have the curvature in, of two directions with different angles of view, the one with the wide angle of view.

In the video display device according to the invention, the observation optical system may include a substrate on which the holographic optical element is formed, and the substrate may be a plate-form substrate having a constant thickness in the direction perpendicular to the surface of the holographic optical element.

In the video display device according to the invention, the substrate may hold the holographic optical element such that the order-0 diffraction light produced on the holographic optical element deviates from the optical path toward the observation pupil.

In the video display device according to the invention, the curved face may be a cylindrical surface having a constant curvature.

In the video display device according to the invention, the curved face may be a surface whose curvature increases the farther away from the tangent flat face.

A head-mounted display according to the invention may be provided with: a video display device as described above; and a support member which supports the video display device in front of the observer's eye.

A head-up display according to the invention may be provided with a video display device as described above, and the holographic optical element in the video display device may be held on a substrate arranged within the observer's field of view.

Advantageous Effects of the Invention

According to the present invention, an HOE surface is composed of a combination of flat faces or a combination of a curved face and a flat face (tangent flat face) so as to be concave toward the observation pupil. Thus, it is possible to reduce the diffraction angle (make it closer to the regular reflection angle) of the image light on the HOE near the center of the angle of view, and in addition to reduce the diffraction angle (make it closer to the regular reflection angle) of the image light on the HOE in end parts of the angle of view as compared with in a case where the HOE surface is composed of a single surface. In this way, even when a wider angle of view is sought, it is possible to keep small the lateral chromatic aberration resulting from dispersion on the HOE, and thus it is possible to allow the observer to observe a high-definition image which has a wide angle of view but nevertheless has a high resolution.

In addition, in a region of the HOE surface where the deviation between the diffraction angle and the regular reflection angle is small (for example, the center of the image area), the HOE surface is composed of a flat face, and in a region of the HOE surface where the deviation between the diffraction angle and the regular reflection angle is large, the HOE surface is composed of a flat face inclined relative to the region with the small deviation, or the HOE surface is composed of a curved face. This helps reduce the deviation between the diffraction angle and the regular reflection angle. In this way, it is possible to make the observation optical system slimmer in the direction of the line of sight as compared with in a case where the entire HOE surface is composed of a curved surface.

Thus, according to the present invention, even when a wider angle of view is sought, it is possible, while making the observation optical system slimmer, to keep color dispersion on the HOE small and allow the observer to observe a high-definition image.

DESCRIPTION OF EMBODIMENTS

Embodiment 1

An embodiment of the present invention will be described below with reference to the accompanying drawings.

(Video Display Device)

Figure 1:
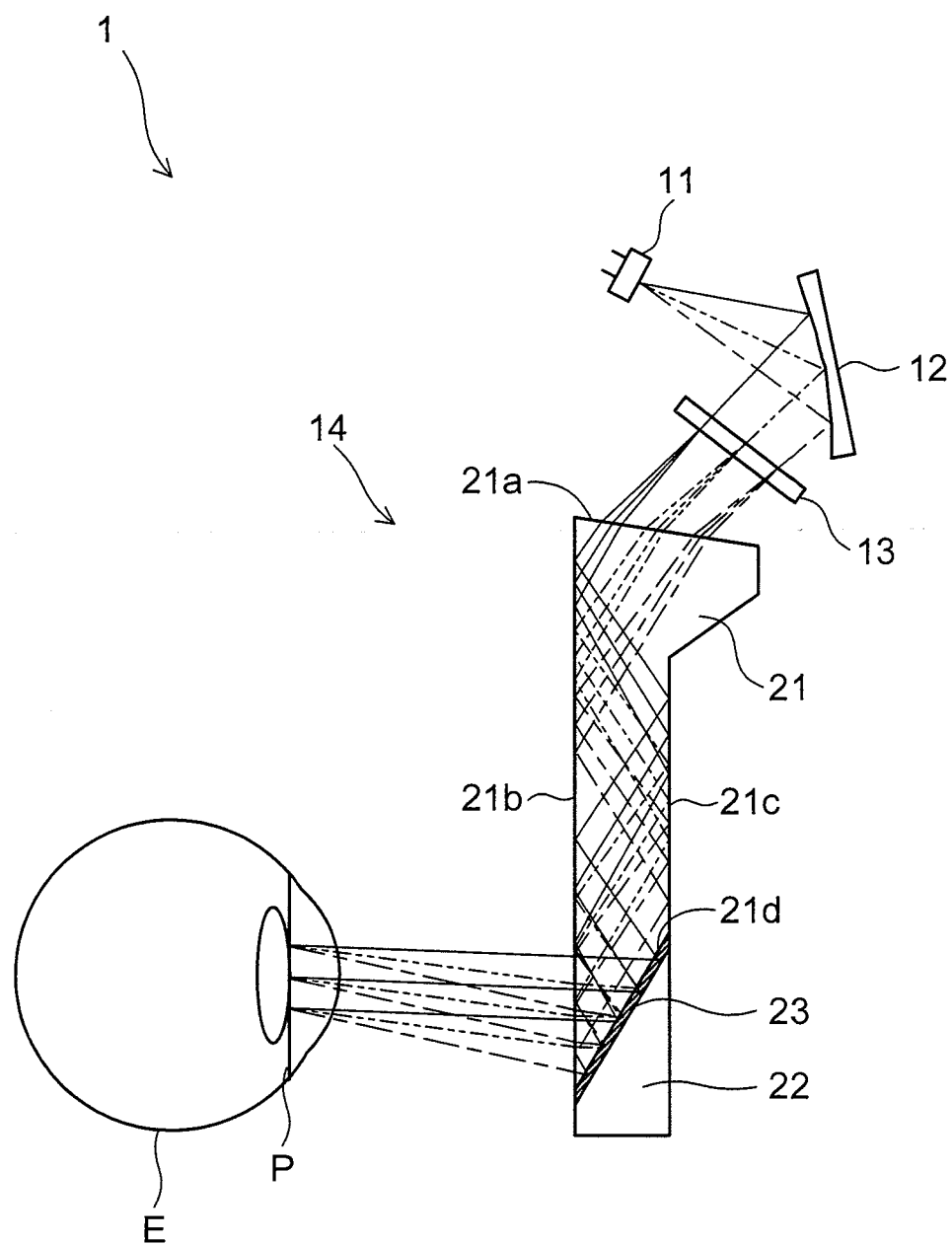
FIG. 1 is a sectional view showing an outline of the configuration of a video display device according to an embodiment of the invention.

FIG. 1 is a sectional view showing an outline of the configuration of a video display device 1 according to this embodiment. The video display device 1 includes a light source 11, an illumination optical system 12, a display element 13, and an eyepiece optical system 14.

The light source 11 illuminates the display element 13, has at least one light emission peak, and emits light with a wavelength width including one light emission peak.

Figure 2:
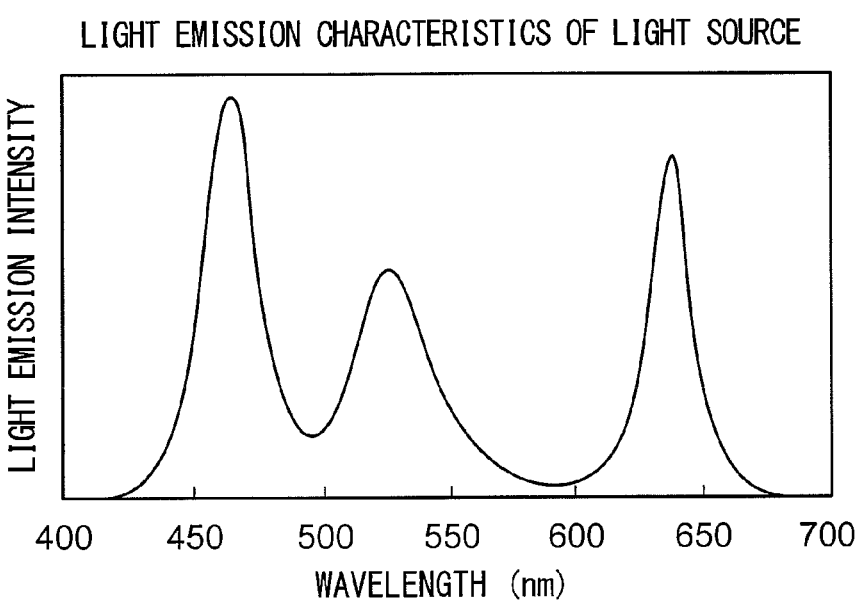
FIG. 2 is a diagram illustrating the light emission characteristics of a light source in the video display device.

FIG. 2 shows the light emission characteristics of the light source 11 in this embodiment. In this embodiment, the light source 11 emits light having light emission peaks in three wavelength bands of blue (B), green (G), and red (R). Specifically, the light source 11 is composed of an RGB integrated LED that emits light in three wavelength bands of, for example, 462±12 nm (B light), 525±17 nm=(G light), and 635±11 nm (R light) in terms of a light emission peak wavelength combined with a full wavelength width of half the peak intensity. In FIG. 2, light emission intensity is presented in terms relative to the maximum light emission intensity of B light assumed to be 100.

The illumination optical system 12 is an optical system that condenses the light from the light source 11 and directs it to the display element 13, and is composed of, for example, a mirror having a concave reflective surface. The display element 13 displays an image by modulating the light incident on it through the illumination optical system 12 from the light source 11 according to image data, and is composed of, for example, a transmissive LCD. The display element 13 is arranged such that the longer-side direction of its display area is aligned with the horizontal direction (the direction perpendicular to the plane of FIG. 1, that is, the left/right direction) and that the shorter-side direction is perpendicular to that direction.

The eyepiece optical system 14 is an observation optical system that directs the image light from the display element 13 to an observation pupil (optical pupil, exit pupil) P to allow an observer to observe a virtual image at the position of the observation pupil P, and is composed of an eyepiece prism 21, a deflecting prism 22, and an HOE 23, that is, a holographic optical element.

The eyepiece prism 21, on one hand, totally reflects inside it the image light from the display element 13 to direct it through the HOE 23 to the observation pupil P and, on the other hand, transmits light from the outside world to direct it to the observation pupil P. The eyepiece prism 21 is, along with the deflecting prism 22, made of, for example, acrylic resin. The eyepiece prism 21 is formed in the shape of a parallel plate of which a lower-end part is wedge-shaped. Of the eyepiece prism 21, the upper-end face is a face 21a which serves as an entrance face for the image light, and the two faces located in the front/rear direction are faces 21b and 21c parallel to each other.

The deflecting prism 22 is composed of a parallel plate that is substantially U-shaped as seen in a plan view and, when bonded to a lower-end part and both side-face parts (left and right end faces) of the eyepiece prism 21, becomes integral with the eyepiece prism 21 to form substantially a parallel plate. The deflecting prism 22 adjoins or is bonded to the eyepiece prism 21 with the HOE 23 interposed between them. Thus, the refraction that occurs when light from the outside world is transmitted through the wedge-shaped lower-end part of the eyepiece prism 21 can be canceled by the deflecting prism 22, and thereby the image of the outside world observed in a see-through fashion is prevented from suffering distortion.

The HOE 23 is a volume phase reflective holographic optical element which, on one hand, diffraction-reflects the image light from the display element 13 to direct it to the observation pupil P and, on the other hand, transmits light from the outside world to direct it to the observation pupil P, and functions as a combiner that allows simultaneous observation of a bright image and a bright outside world. The HOE 23 is formed on the face 21d of the eyepiece prism 21 which is the bonding face with the deflecting prism 22. The surface of the HOE 23 is composed of a composite surface divided into a plurality of flat faces, of which the details will be given later. The HOE 23 has a positive optical power that is axis-asymmetric (non-rotation-symmetric), and functions like an aspherical concave mirror (free-form-curved mirror) having a positive optical power This helps increase flexibility in the arrangement of individual optical members constituting the device and thereby allow easy size reduction of the device, and also makes it possible to present the observer with a properly aberration-corrected image.

Figure 3:
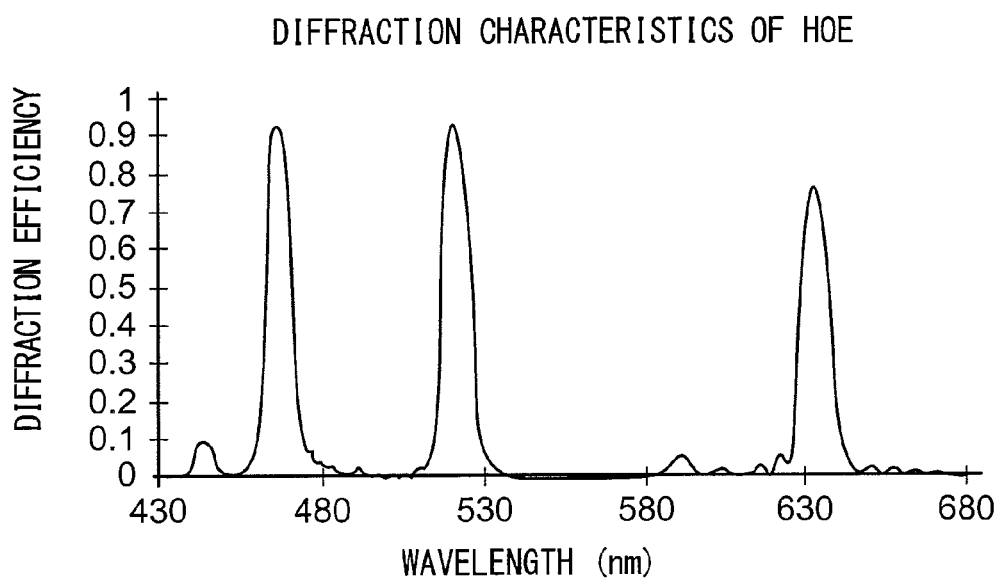
FIG. 3 is a diagram illustrating the diffraction characteristics of an HOE in an eyepiece optical system in the video display device.

FIG. 3 shows the diffraction characteristics of the HOE 23. As shown there, the HOE 23 has angle selectivity and wavelength selectivity such as to diffraction-reflect light that is incident at a particular incidence angle and that is spread in three wavelength bands of, for example, 465±5 nm (B light), 521±5 nm (G light), and 634±5 nm (R light) in terms of a diffraction peak wavelength combined with a full wavelength width of half the peak diffraction efficiency.

In the above configuration, the light emitted from the light source 11 is reflected and condensed by the illumination optical system 12 so as to be incident, as substantially collimated light, on the display element 13, which modulates the light to emit it as image light. The image light from the display element 13 enters, through the face 21a, the eyepiece prism 21 in the eyepiece optical system 14, is then totally reflected at least once on each of the faces 21b and 21c, and is then incident on the HOE 23.

The HOE 23, with its composite surface as a whole, has an optical power equivalent to that of a concave free-form-curved surface, and has, as shown in FIG. 3, diffraction efficiency in the wavelength bands corresponding to the light emission wavelength bands of the light source 11. Accordingly, of the image light having reached the HOE 23, only the parts in the wavelength bands where there is any diffraction efficiency is diffraction-reflected to reach the observation pupil P. Thus, when the observer's eye (pupil) E is located at the position of the observation pupil P, the observer can observe, in front of his eye, an enlarged virtual image of the image displayed on the display element 13. On the other hand, in the wavelength bands where there is no diffraction efficiency, the HOE 23 simply functions as a transparent film. Thus, the observer can, while observing the image, also observe the outside world in front of his eye.

(Relationship Between Diffraction Angle and Color Dispersion)

Next, prior to a detailed discussion of the HOE surface in this embodiment, the relationship between diffraction angle and color dispersion in a common flat-plate-form HOE will be described.

Figure 4A:
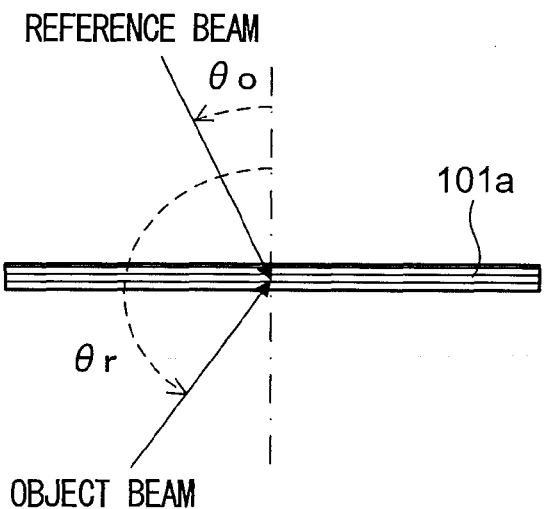
FIG. 4(a) is a diagram illustrating the state, during exposure, of a holographic photosensitive material used to fabricate a flat-plate-form HOE.
Figure 4B:
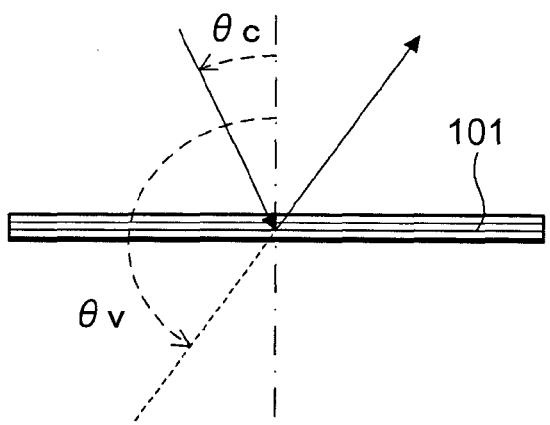
FIG. 4(b) is a diagram illustrating the state, during use, of the HOE.

FIG. 4(a) shows a state, during exposure, of a holographic photosensitive material 101a used to fabricate a flat-plate-form HOE 101, and FIG. 4(b) shows a state, during use (reconstruction), of the HOE 101. Let the incidence angles of two light beams used for exposing the holographic photosensitive material 101a with respect to the holographic photosensitive material 101a be θo (°) and θr (°) respectively, and let the exposure wavelength be γr (nm). Moreover, let the incidence angle and the emergence angle of the reconstruction beam with respect to the HOE 101 be θc (°) and θv (°), and let the use wavelength (reconstruction wavelength) be γc (nm).

In the diffraction on the HOE 101, the diffraction efficiency is highest when the Bragg condition formula below is fulfilled.

[Formula 1]

$$\frac{1}{\lambda_r}(\sin\theta_o - \sin\theta_r) = \frac{1}{\lambda_c}(\sin\theta_v - \sin\theta_c) \quad (1)$$

[Formula 2]

$$\frac{1}{\lambda_r}(\cos\theta_o - \cos\theta_r) = \frac{1}{\lambda_c}(\cos\theta_v - \cos\theta) \quad (2)$$

Formula (1) relates to diffraction on a thin HOE 101. The intervals of the interference fringes formed during exposure of the holographic photosensitive material 101a depend on the incidence angles of the object beam and reference beam during exposure and the exposure wavelength. During reconstruction, the light intensity of the diffracted light is highest in the direction in which the rays emerging from adjacent fringes (adjacent low-refractive-index portions or adjacent high-refractive-index portions of the interference fringes) are deviated by one wavelength. From these facts, formula (1) is derived. When two beams of a wavelength of γr are incident on the holographic photosensitive material 101a at incidence angles of θo and θr, those beams interfere and record a hologram (interference fringes). When this hologram is irradiated with a reconstruction beam of a wavelength of γc from an angle of θc, diffracted light occurs in the direction of an angle of θv.

By contrast, on a thick HOE 101, interference fringes are recorded three-dimensionally, and therefore not only formula (1) but also the state of the interference fringes in the thickness direction has to be taken into consideration. Formula (2) is the formula that relates to the diffraction by interference fringes in the thickness direction. That is, formula (2) is a formula that, with respect to the hologram formed when two beams of a wavelength of γr are incident on the holographic photosensitive material 101a at incidence angles of θo and θr, identifies the wavelength of the light reconstructed when the hologram is irradiated with a reconstruction beam from an angle of θc. The thicker the HOE 101, the narrower the HWHM (half width at half maximum) of the diffraction wavelength band of formula (2), and the stricter the conditions for reconstruction.

With a volume phase hologram, Formulae (1) and (2) should preferably be fulfilled simultaneously. At least formula (1) has to be fulfilled, and this leads to the following assumptions.

From formula (1), the emergence angle θv of the reconstruction beam is given by Formula (3) below.

[Formula 3]

$$\sin\theta_v = \sin\theta_c + \frac{\lambda_c}{\lambda_r}(\sin\theta_o - \sin\theta_r) \quad (3)$$

In Formula (3), when Formula (4) below is fulfilled, the term that depends on wavelength disappears. Thus, the direction of the light diffracted on the HOE 101 remains constant irrespective of wavelength, namely the direction that fulfills sin θv=sin θc, that is, θv=180°−θc. This means that the direction of diffraction on the HOE 101 coincides with the direction in which regular reflection occurs on the substrate on which the HOE 101 is formed, and thus that no deviation in diffraction direction results from a deviation between the exposure wavelength and the reconstruction wavelength.

[Formula 4]

$$\sin\theta_o - \sin\theta_r = 0 \quad (4)$$

By contrast, in Formula (3), when Formula (5) below is fulfilled, a term that depends on wavelength is present. Thus, the direction of the light diffracted on the HOE 101 is not a direction that fulfills sin θv=sin θc, that is, θv=180°−θc. That is, when there is a deviation between the exposure wavelength and the reconstruction wavelength, the direction of diffraction on the HOE 101 deviates from the direction of regular reflection on the substrate on which the HOE 101 is formed, and thus the diffraction angle (emergence angle θv) varies with wavelength. Accordingly, when a light source is used that produces a reconstruction beam spreading over a wavelength width, the diffraction angle of the reconstruction beam spreads over a width corresponding to the wavelength width, and the image suffers degradation ascribable to color dispersion resulting from diffraction.

[Formula 5]

$$\sin\theta_o - \sin\theta_r = 0 \quad (5)$$

When the HOE surface is composed of a single flat face, in particular in a direction in which the angle of view is wide (for example, in the horizontal direction), a larger deviation of the diffraction angle from the regular reflection angle (between the incidence angle and the diffraction angle) occurs at the periphery of the image area than at its center. This results in extremely large color dispersion at the periphery of the image area and hence serious degradation in image quality.

(Details of HOE Surface)

Next, the HOE surface in this embodiment will be described in detail.

Figure 5:
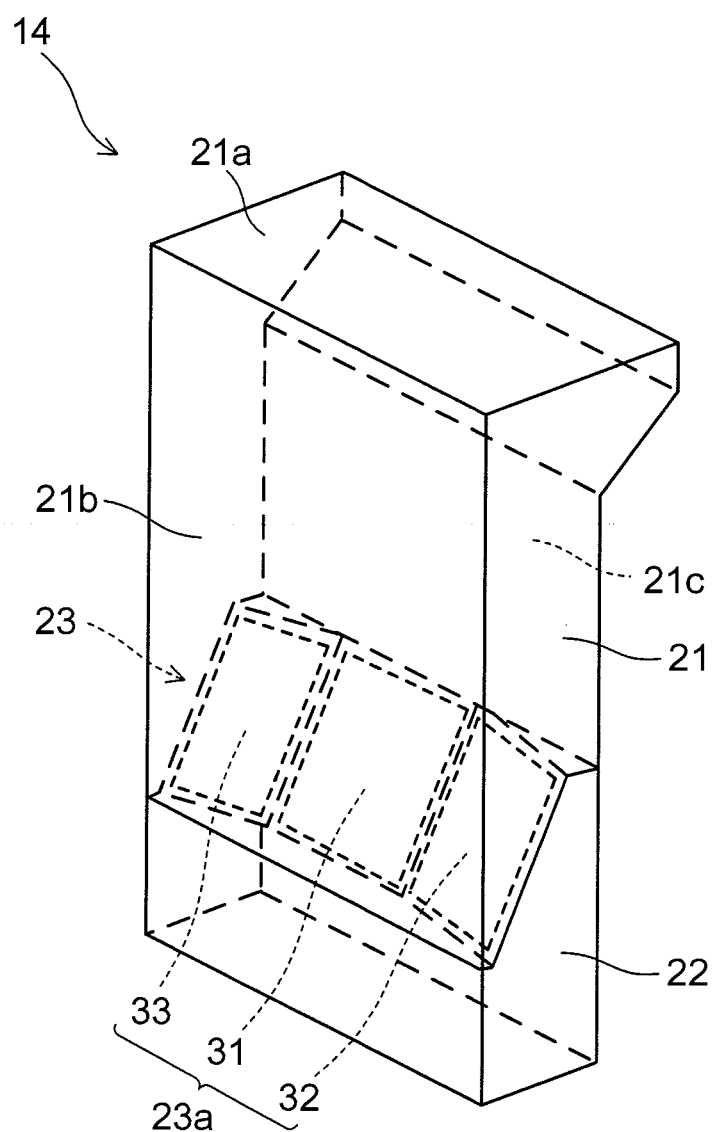
FIG. 5 is a perspective view of the eyepiece optical system in the video display device.

FIG. 5 is a perspective view of the eyepiece optical system 14 which includes the HOE 23 described above. As shown there, the surface 23a of the HOE 23 (hereinafter referred to the HOE surface 23a) is composed of a composite surface that is divided into a plurality of flat faces only in one direction. The HOE 23 is formed on the face 21d (see FIG. 1) of the eyepiece prism 21, and the HOE surface 23a is formed along the face 21d. Thus, by composing the face 21d of the eyepiece prism 21 of a composite surface that is divided into a plurality of flat faces only in one direction, it is possible to form the HOE surface 23a mentioned above.

The HOE surface 23a is divided into three flat faces, namely a first flat face 31 located at the enter and a second and a third flat face 32 and 33 located on both sides of it in the horizontal direction. These three flat faces are arranged symmetrically in the horizontal direction so as to be concave toward the observation pupil P shown in FIG. 1, and the second and third flat faces 32 and 33 at both sides are arranged with an inclination with respect to the first flat face 31 at the center.

Let the axis that optically connects the center of the display surface of the display element 13 to the center of the observation pupil P formed by the eyepiece optical system 14 be the optical axis, and let the plane that includes the optical axes of both the incident light and the emergent light with respect to the HOE 23 in the eyepiece optical system 14 be the principal plane. Then, the HOE surface 23a can be said to be formed in a shape that is symmetric left to right about the principal plane as the plane of symmetry.

Here, the HOE surface 23a includes both the surface of an effective region of the HOE 23 and the surface of a non-effective region of the HOE 23. An effective region of the HOE 23 refers to, of the entire area in which a holographic photosensitive material is formed when the HOE 23 is fabricated, a region that actually functions as the HOE 23. That is, it is a region where a hologram (interference fringes) is formed by exposure through an exposure process described later, a the region that diffracts incident light (the region that has diffraction efficiency). By contrast, a non-effective region of the HOE 23 refers to, of the entire area in which the holographic photosensitive material is formed, a region that does not function as the HOE 23. That is, it is a region where no hologram is formed, and is a region that does not diffract but transmits incident light.

Figure 6:
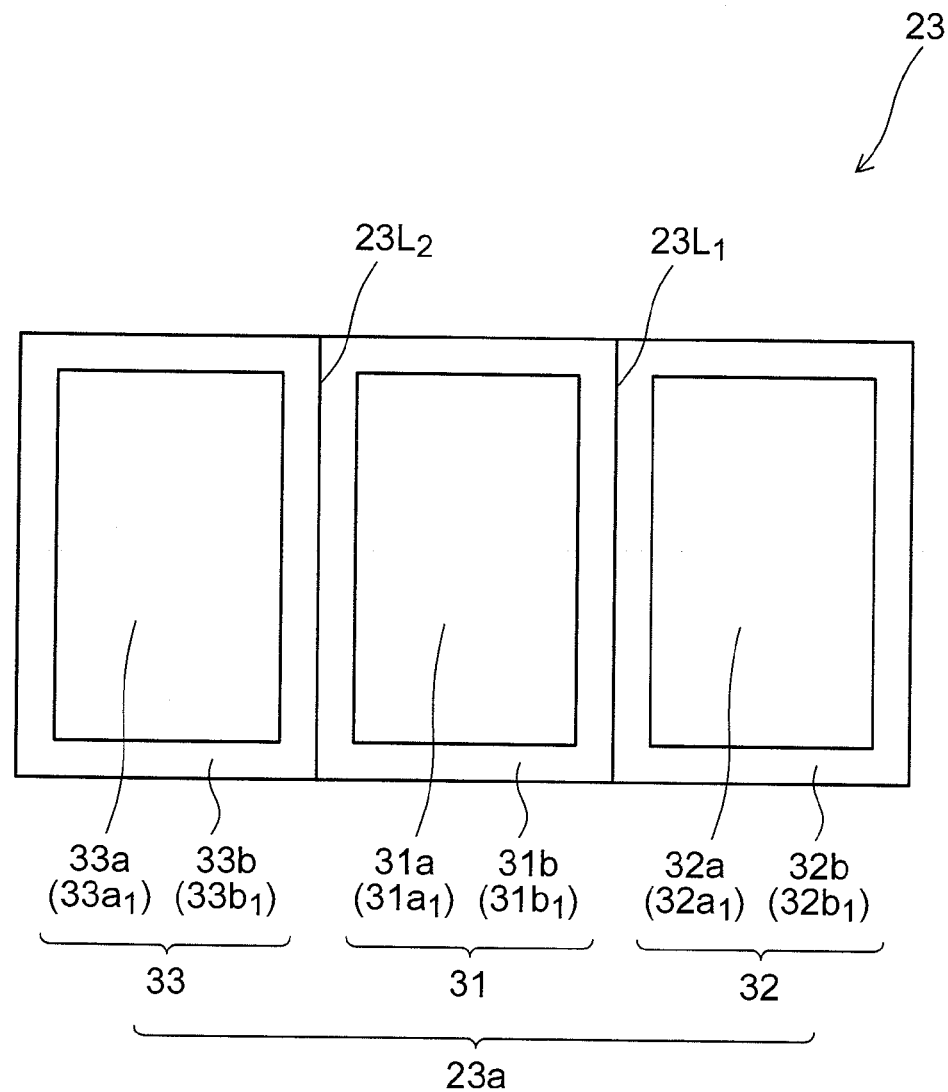
FIG. 6 is a plan view of the surface of the HOE in the eyepiece optical system as it would appear when developed on a single plane.

FIG. 6 is a schematic plan view of the HOE surface 23a as it would appear when developed on a single plane. The first, second, and third flat faces 31, 32, and 33 constituting the HOE surface 23a are configured as follows. The first flat face 31 is composed of the surface $31a_1$ of an effective region 31a of the HOE 23 and the surface $31b_1$ of a non-effective region 31b formed so as to surround the effective region 31a. The second flat face 32 is composed of the surface $32a_1$ of an effective region 32a of the HOE 23 and the surface $32b_1$ of a non-effective region 32b formed so as to surround the effective region 32a. The third flat face 33 is composed of the surface $33a_1$ of an effective region 33a of the HOE 23 and the surface $33b_1$ of a non-effective region 33b formed so as to surround the effective region 33a.

Of the HOE 23, the non-effective regions 31b and 32b are connected with each other along the ridge line $23L_1$ between the first and second flat faces 31 and 32, and the non-effective regions 31b and 33b are connected with each other along the ridge line $23L_2$ between the first and third flat faces 31 and 33. As a result, the effective regions 31a and 32a of the HOE 23 are away from each other across the ridge line $23L_1$ between the first and second flat faces 31 and 32, and the effective regions 31a and 33a of the HOE 23 are away from each other across the ridge line $23L_2$ between the first and second flat faces 31 and 33. That is, The effective regions of the HOE 23 corresponding to the individual flat faces are formed away from each other across the ridge lines between those flat faces.

Based on the foregoing, the plurality of flat faces of the HOE surface 23a can be said to be contiguous with each other so as to have a common ridge line along the boundary between adjoining flat faces. Specifically, the first flat face 31 and the second flat face 32 are formed contiguous with each other so as to have a common ridge line 23L$_1$ along their boundary, and the first flat face 31 and the third flat face 33 are formed contiguous with each other so as to have a common ridge line 23L$_2$ along their boundary. In this way, the plurality of flat faces are formed contiguous with each other across the ridge line between adjoining flat faces.

In this embodiment, the rays (referred to as the principal rays) emanating from the center of the display area of the display element 13 and traveling toward the center of the observation pupil P are diffracted on the HOE surface 23*a* (in particular, on the first flat face 31) at an angle close to that of regular reflection. Here, the difference $\Delta\theta$ in diffraction angle between order-0 diffraction light (regular reflection light) and order-1 diffraction light fulfills the formula $\Delta\theta<3°$.

By, as described above, dividing the HOE surface 23*a* into a plurality of flat faces, namely the first, second, and third flat faces 31, 32, and 33 and, as shown in FIG. 5, arranging the second and third flat faces 32 and 33 at both sides with an inclination with respect to the first flat face 31 at the center such as to be concave toward the observation pupil P, it is possible to reduce the diffraction angle of the image light near the center of the angle of view with the first flat face 31 of the HOE 23 (for example, so as to fulfill $\Delta\theta<3°$), and in addition to reduce the diffraction angle of the image light in end parts of the angle of view in the horizontal direction with the second and third flat faces (for example, so as to fulfill $<3°$). In this way, even with a wider angle of view in the horizontal direction is sought, it is possible to keep the lateral chromatic aberration resulting from dispersion on the HOE 23 low with a good balance over the entire image area. It is thus possible to allow the observer to observe a high-definition image that has a wide angle of view but nevertheless has a high resolution. In addition, these benefits can be obtained with a simple configuration involving dividing the HOE surface 23*a* into a plurality of flat faces only in one direction (here, in the horizontal direction).

In a case where Formula (4) noted above is fulfilled over the entire region of the HOE 23, no degradation due to color dispersion results, but then the entire optical power to be given the HOE 23 needs to be determined by the surface shape, and this requires the HOE surface 23*a* to be a curved surface, making the eyepiece prism 21 thicker in the direction frontward of the eye than in a case where the HOE surface is a flat surface. By contrast, by composing the HOE surface 23*a* of a plurality of contiguous flat faces as in this embodiment, it is possible to keep low the increase in the thickness in the direction frontward of the eye and, even when the HOE 23 is given a optical power, it is possible to keep low the maximum deviation between the incidence angle and the diffraction angle with the flat faces. As a result, it is possible to suppress degradation in image quality resulting from color dispersion ascribable to a deviation between the exposure wavelength and the reconstruction wavelength (a wavelength width during reconstruction). Moreover, when the HOE surface 23*a* is composed of a plurality of flat faces, for a region of the HOE surface 23*a* where there is a large deviation between the diffraction angle and the regular reflection angle, it is possible to easily set the angle of the HOE surface 23*a* (the second and third flat faces 32 and 33) such as to reduce the deviation.

That is, with the configuration of this embodiment, even when a wider angle of view is sought, as compared with in a case where the entire HOE surface is composed of a curved surface, it is possible to make the eyepiece optical system 14 slimmer and in addition keep the color dispersion by the HOE 23 low to allow the observer to observe a high-definition image.

Moreover, in this embodiment, since the longer-side direction of the display area of the display element 13 is aligned with the horizontal direction, the observation angle of view of the image is wider in the horizontal direction corresponding to the longer-side direction of the display area than in the vertical direction corresponding to its shorter-side direction. Accordingly, the HOE surface 23*a* can also be said to be divided into a plurality of flat faces only in, of two directions in which the observation angle of view of the image differs, the one with the wider angle of view.

As described above, when the HOE surface is composed of a single flat plane, in particular with respect to the image light in end parts of the angle of view in the direction with the wider angle of view, a large deviation arises between the incidence angle and the diffraction angle. To cope with that, by dividing the HOE surface 23*a* into a plurality of flat faces in the direction with the wider angle of view, and arranging those flat faces such as to be concave toward the observation pupil P, it is possible to obtain an extremely effective effect of keeping lateral chromatic aberration in end parts of the angle of view low when a wider angle of view is sought, and thus it is possible to reliably allow the observer to observe a high-definition image over the entire image area.

Moreover, as described above, the effective regions of the HOE 23 corresponding to the flat faces of the HOE surface 23*a* are formed away from each other across the ridge lines between those flat faces. If an effective region of the HOE 23 is formed so as to cross the ridge line (boundary) between divided flat faces, the optical characteristics of the HOE 23 abruptly vary near the ridge line, and thus the observed image (virtual image) has degraded imaging characteristics. By locating the ridge line between flat faces way from effective regions of the HOE 23, therefore, it is possible to avoid degradation in image quality resulting from variation in the optical characteristics of the HOE 23 near the ridge line.

Here, it is preferable that the width outside an effective region near a ridge line (the width between the ridge line and the effective region) be more than 0.3 mm but less than 1.0 mm. Too small a width there leads to notable degradation in image quality due to variation in optical characteristics bear the ridge line. A width of 1.0 mm or more there leads to a notable reduction in the amount of light passing near the ridge line, and hence uneven image brightness.

Moreover, in this embodiment, as described above, the deflecting prism 22 is provided opposite the eyepiece prism 21 across the HOE 23. Providing the deflecting prism 22 eliminates refraction on the surface of the HOE 23 when the observer observes the outside world through the eyepiece prism 21 and the HOE 23, and thereby allows the observer to observe a natural outside world. In addition, the order-0 diffraction light on the HOE 23 is transmitted through the deflecting prism 22 and deviates from the optical path toward the observation pupil P. This helps reduce surface reflection on the surface of the HOE 23 and thereby suppress observation of a ghost image due to regular reflection light (order-0 diffraction light).

(Fabrication of HOE)

Figure 7:
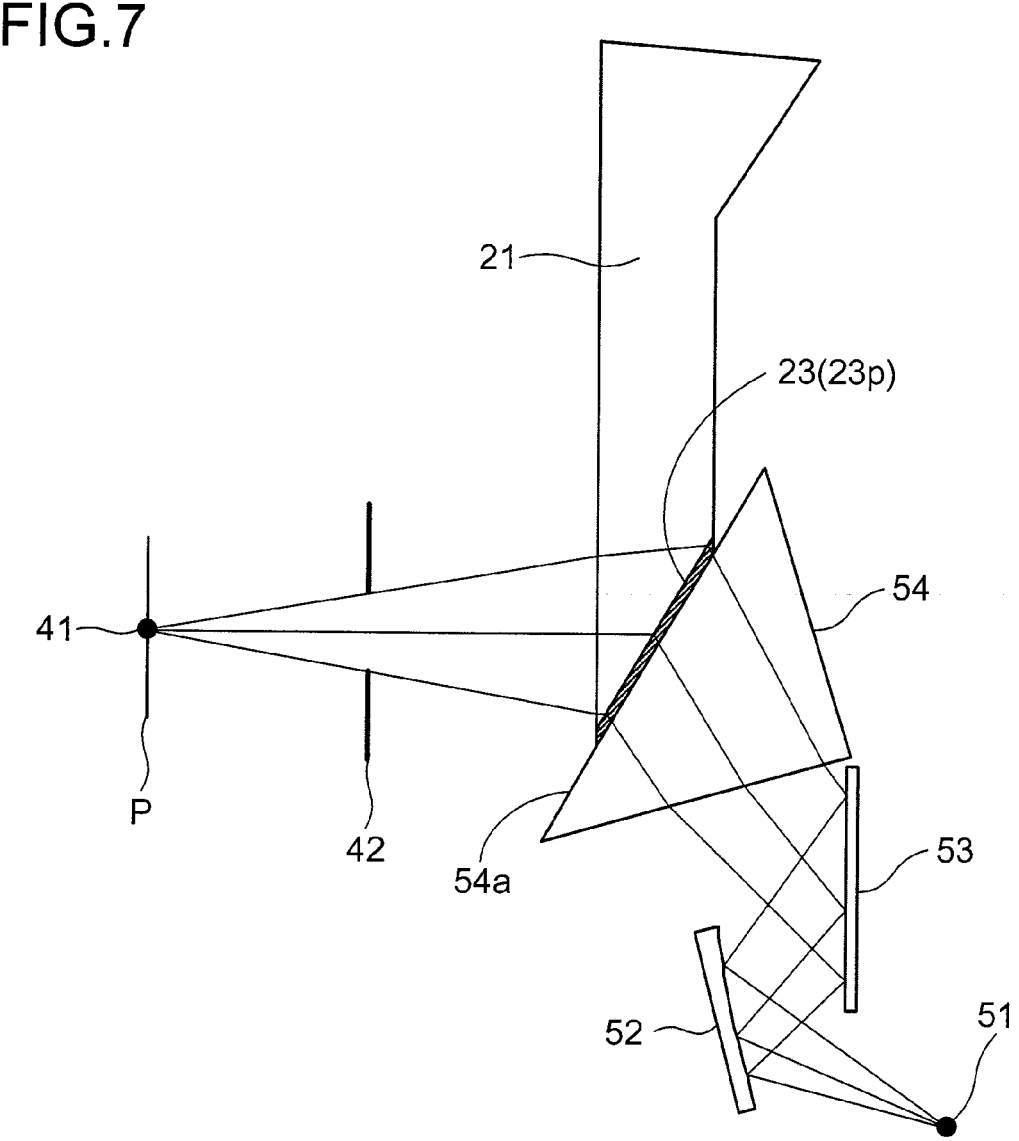
FIG. 7 is a sectional view showing an outline of the configuration of an exposure optical system for fabricating the holographic optical element.

Next, a process of fabricating (exposing) the HOE 23 described above will be described. FIG. 7 is a sectional view showing an outline of the configuration of an exposure optical system for fabricating the HOE 23. The reflective HOE 23 is fabricated as follows. For each of R, G, and B, laser light is split into two beams referred to as the reference beam and the object beam. A holographic photosensitive material 23p on a substrate (here, the eyepiece prism 21) is exposed to the two beams (reference and object beams) from the substrate side and the opposite side respectively so that the interference fringes formed by the two beams are recorded on the holographic photosensitive material 23p. More specifically, the process proceeds as described below. Here, it is assumed that the beam on the side where the observer's eye is located is the reference beam, and that the beam from the opposite side is referred to as the object beam. It is also assumed that the light emission wavelengths of the R, G, and B laser are 647 nm, 532 nm, and 476 nm respectively.

The holographic photosensitive material 23p is a film-form photosensitive material cut into a single rectangular piece, and is bonded to three divided flat faces on the substrate (eyepiece prism 21) so as to be contiguous between the those flat faces. The three flat faces on the substrate are the faces that make contact with the first, second, and third flat faces 31, 32, and 33 on the HOE 23. Here, usable as the holographic photosensitive material 23p is photopolymer, silver halide emulsion, dichromated gelatin, or the like, among which photopolymer is preferable because it permits the HOE 23 to be fabricated by a dry process.

First, for each of R, G, and B, laser light is split into two beams by a beam splitter, and then the beams (reference and object beams) are each condensed so as to be formed into a divergent beam divergent from point light sources 41 and 51 respectively.

The R, G, and B reference beams are spherical waves emanating from point light sources 41 located at the same position, and are incident on the holographic photosensitive material 23p from the eyepiece prism 21 side through an exposure mask 42 described later. Here, the point light sources 41 for R, G, and B are located at the center of the observation pupil P of the eyepiece optical system 14 as it is during the observation of the image. The point light sources 41 for R, G, and B may instead be located at the observation pupil P of the eyepiece optical system 14 with displacements between them such as to correspond to deviations between the peak wavelengths of the light source 11 used during use and the light emission wavelengths of the laser used during fabrication so that, during use, the light of the R, G, and B peak wavelengths from the light source 11 (LED) coincide at the position of the point light sources 41 when diffracted by the HOE 23.

On the other hand, the R, G, and B object beams are divergent beams emanating from point light sources 51 at the same position; they are shaped to have a predetermined wave front by the a free-form-curved-surface mirror 52, are reflected on a reflecting mirror 53, and are incident on the holographic photosensitive material 23p from the side opposite from the eyepiece prism 21 through a color correction prism 54. Here, a face 54a of the color correction prism 54 is held at an angle such as to correct the chromatic aberration ascribable to refraction of the image light on the face 21a (see FIG. 1) of the eyepiece prism 21 in the eyepiece optical system 14 used during use. To prevent ghosts resulting from surface reflection, it is preferable that the color correction prism 54 be arranged either in close contact with the holographic photosensitive material 23p or with emulsion oil or the like in between.

Through the irradiation of the holographic photosensitive material 23p with the reference beam and the object beam as described above, interference fringes by those two beams are recorded in the holographic photosensitive material 23p, and thereby the HOE 23 is fabricated.

In a configuration where, as in this embodiment, the HOE surface 23a is divided into a plurality of flat faces only in one direction, the HOE 23 can be fabricated by use of a single continuous holographic photosensitive material as described above, and can thus be fabricated easily.

Figure 8:
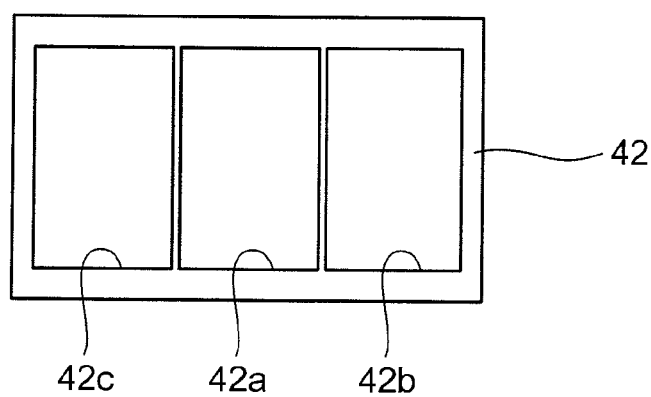
FIG. 8 is a plan view of an exposure mask arranged in the optical path of the exposure optical system.

Here, FIG. 8 is a plan view of the exposure mask 42 arranged in the optical path between the point light sources 41 and the eyepiece prism 21. The exposure mask 42 has openings 42a, 42b, and 42c. The openings 42a, 42b, and 42c are formed in shapes corresponding to the effective regions 31a, 32a, and 33a (see FIG. 6) of the HOE 23, and serve to mask regions including the ridge lines $23L_1$ and $23L_2$ during exposure such that no interference fringes are recorded across the ridge lines $23L_1$ and $23L_2$.

Accordingly, of the light (reference beam) emanating from the point light sources 41, only the part that has passed through the openings 42a, 42b, and 42c in the exposure mask 42 strikes the holographic photosensitive material 23p and records, by interfering with the object beam, interference fringes. The regions where the interference fringes are recorded are the effective regions 31a, 32a, and 33a of the HOE 23.

In this way, the exposure mask 42 functions as an aperture stop that restricts the region in which the holographic photosensitive material 23p is irradiated with the reference beam. Thus, the effective regions corresponding to the divided flat faces on the HOE 23 can be said to be restricted by an aperture stop (exposure mask 42) in the optical path of the exposure optical system for exposing the holographic photosensitive material 23p.

Thus, of the HOE 23, only the region where the interference fringes are formed by exposure functions as an effective region having the desired optical characteristics. For example, in this embodiment, if an attempt is made to restrict the effective region of the HOE 23 only with the exterior shape (size) of the holographic photosensitive material 23p, since the holographic photosensitive material 23p needs to be arranged in a form divided among the flat faces on the eyepiece prism 21, a complicated fabrication process is required. Moreover, the edge of the holographic photosensitive material 23p produces flare and degrades image quality.

By contrast, by restricting the effective region of the HOE 23 with an aperture stop (exposure mask 42) in the optical path of the exposure optical system as in this embodiment, it is possible to form an effective region of the HOE 23 inward of the region where the holographic photosensitive material 23p is formed. This makes it possible to first arrange a single piece of the holographic photosensitive material 23p common to the flat faces on the substrate and then form effective regions of the HOE 23 corresponding to the flat faces respectively. This makes the fabrication of the HOE 23 easy. Moreover, the effective region of the HOE 23 can then be made not to include the edge of the holographic photosensitive material 23p, and thus it is possible to avoid degradation in image quality due to the edge of the holographic photosensitive material 23p.

Moreover, by arranging the exposure mask 42 in the optical path, it is possible to form the HOE 23 located on three flat faces on the substrate by exposure with a single exposure optical system. That is, by exposing the holographic photosensitive material 23p located on three flat faces on the substrate simultaneously, it is possible to fabricate the HOE 23 located on all the flat faces. This helps simplify the fabrication process. Moreover, the HOE 23 then has no relative positional deviation among the flat faces, and thus the parts of the image area corresponding to those flat faces have no positional deviation relative to one another. This helps prevent degradation in image quality over the entire image area.

It is also possible to form a holographic photosensitive material continuously over the flat faces on the substrate and then expose the holographic photosensitive material on those flat faces sequentially by use of exposure masks corresponding to the flat faces respectively so as to sequentially fabricate HOEs 23 located on those flat faces respectively. In that case, a plurality of exposure optical systems are needed; even then, it is still possible to form an HOE 23 located on flat faces on the substrate.

Embodiment 2

Another embodiment of the present invention will be described below with reference to the accompanying drawings. For convenience' sake, such components as find their counterparts in Embodiment 1 are identified by common reference signs, and no overlapping description will be repeated.

Figure 9:
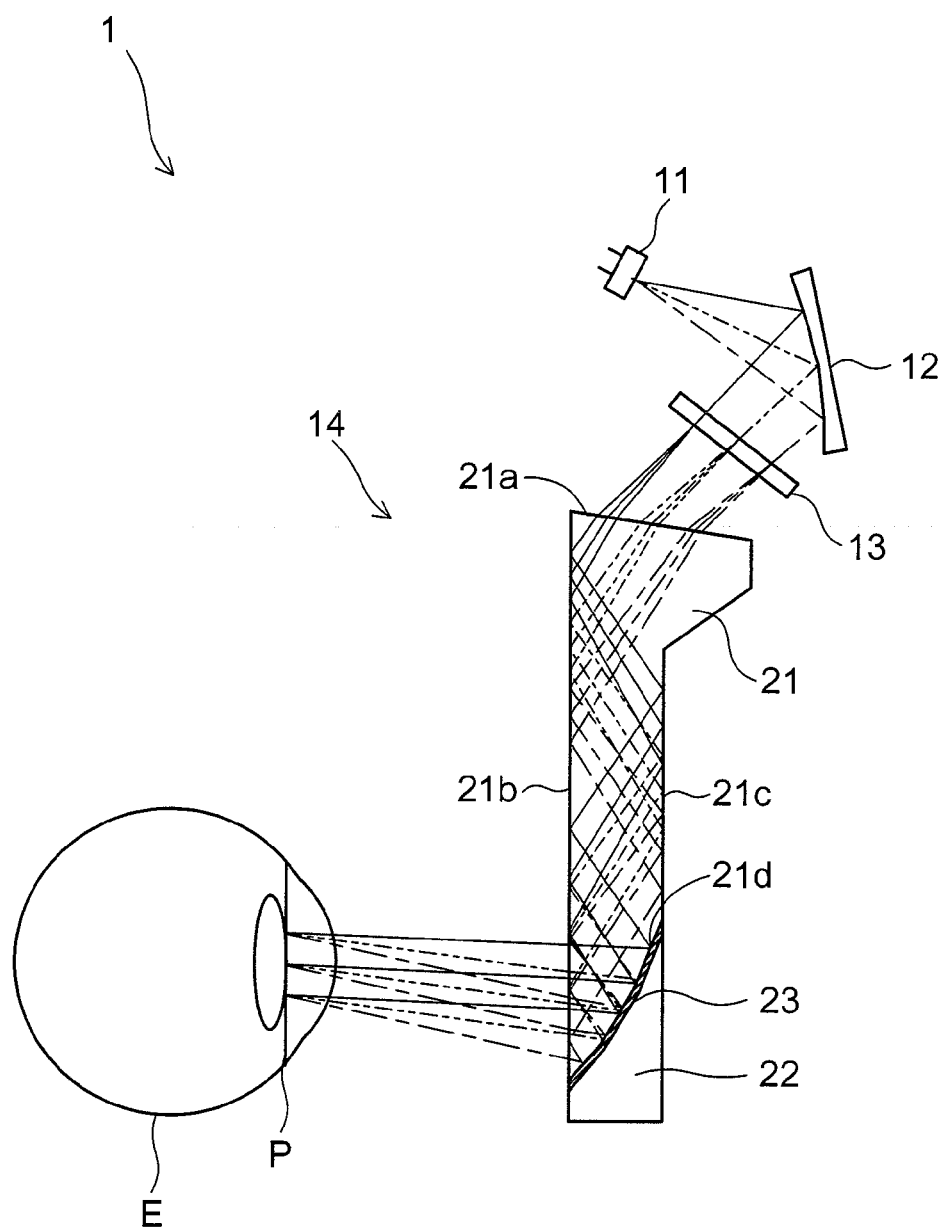
FIG. 9 is a sectional view showing an outline of the configuration of a video display device according to another embodiment of the invention.
Figure 10:
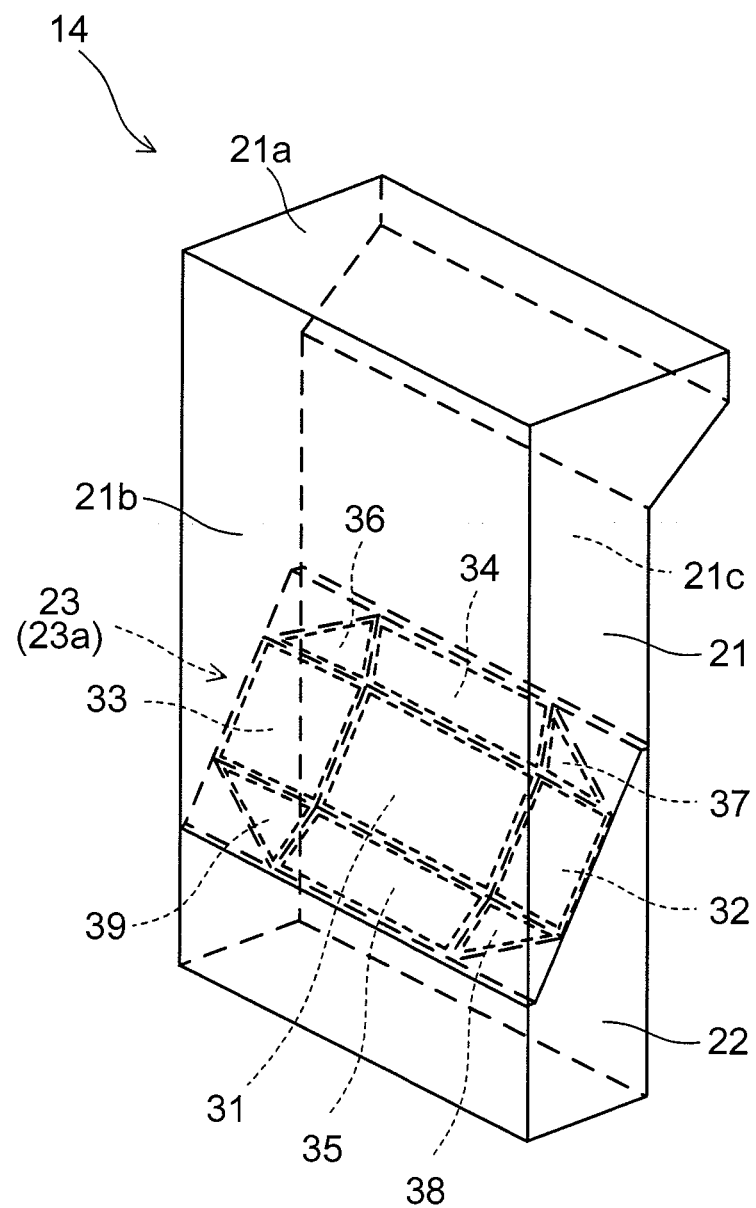
FIG. 10 is a perspective view of an eyepiece optical system in the video display device.

FIG. 9 is a sectional view showing an outline of the configuration of a video display device 1 according to this embodiment. FIG. 10 is a perspective view of an eyepiece optical system 14 in the video display device 1. The video display device 1 according to this embodiment differs from that of Embodiment 1 in that an HOE surface 23a having an optical power equivalent to a free-form-curved concave mirror is divided into a plurality of flat faces in two directions.

Specifically, the HOE surface 23a is composed of a composite surface divided into nine flat faces (a first to a ninth flat face 31 to 39) resulting from three-part division in each of the horizontal and up/down directions. The first flat face 31 is rectangular and is located at the center. The second and third flat faces 32 and 33, which are rectangular, are located on both sides of the first flat face 31 in the horizontal direction. The fourth and fifth flat faces 34 and 35, which are rectangular, are located on both sides of the first flat face 31 in the up/down direction. The HOE surface 23a is as a whole substantially octangular, and the sides of the second to fifth flat faces 32 to 35 opposite from the first flat face 31 form every second side of the octangle. The sixth, seventh, eighth, and ninth flat faces 36, 37, 38, and 39, which are triangular, are so located that the rest of the sides of the octangle are slant sides.

These nine flat faces are so arranged as to be concave toward the observation pupil P shown in FIG. 9. The second to ninth flat faces 32 to 39 are inclined with respect to the first flat face 31. Moreover, the HOE surface 23a is shaped symmetrically in the horizontal direction about the principal plane as the plane of symmetry, and is arranged with an inclination (so as to be decentered) in the up/down direction parallel to the principal plane. As in Embodiment 1, also here, the plurality of flat faces of the HOE surface 23a are contiguous with each other so as to have a common ridge line between adjoining flat faces.

This HOE 23 is fabricated as follows. A film-form holographic photosensitive material is cut along the exterior shape of the nine flat faces of the substrate (eyepiece prism 21), and is bonded to those flat faces. Then, the holographic photosensitive material on those flat faces are exposed by use of a single exposure optical system, and thereby the HOE 23 according to this embodiment is fabricated. Instead, the holographic photosensitive material located on the flat faces of the substrate may be exposed sequentially so that HOEs 23 located on the flat faces respectively are fabricated sequentially. By either method, it is possible to make the plurality of flat faces of the HOE surface 23a contiguous with each other (not apart from each other) along the ridge lines between adjoining flat faces.

In a configuration where, as in this embodiment, the HOE surface 23a is divided into a plurality of flat faces in two directions (horizontal and up/down directions) and is so arranged as to be concave toward the observation pupil P, it is possible to reduce the diffraction angle of the image light near the center of the angle of view with the first flat face 31 of the HOE 23, and in addition to reduce the diffraction angle of the image light in end parts of the angle of view in each of the horizontal and vertical directions with the other flat faces (second to ninth flat faces 32 to 39). Thus, even when a wider angle of view is sought in either of the horizontal and up/down directions, it is possible to keep the lateral chromatic aberration resulting from dispersion on the HOE 23 low with a good balance, and it is possible to cope with a wider angle of view in either of the two directions.

Embodiment 3

Yet another embodiment of the present invention will now be described with reference to the accompanying drawings. For convenience' sake, such components as find their counterparts in Embodiments 1 and 2 are identified by common reference signs, and no overlapping description will be repeated.

Figure 11:
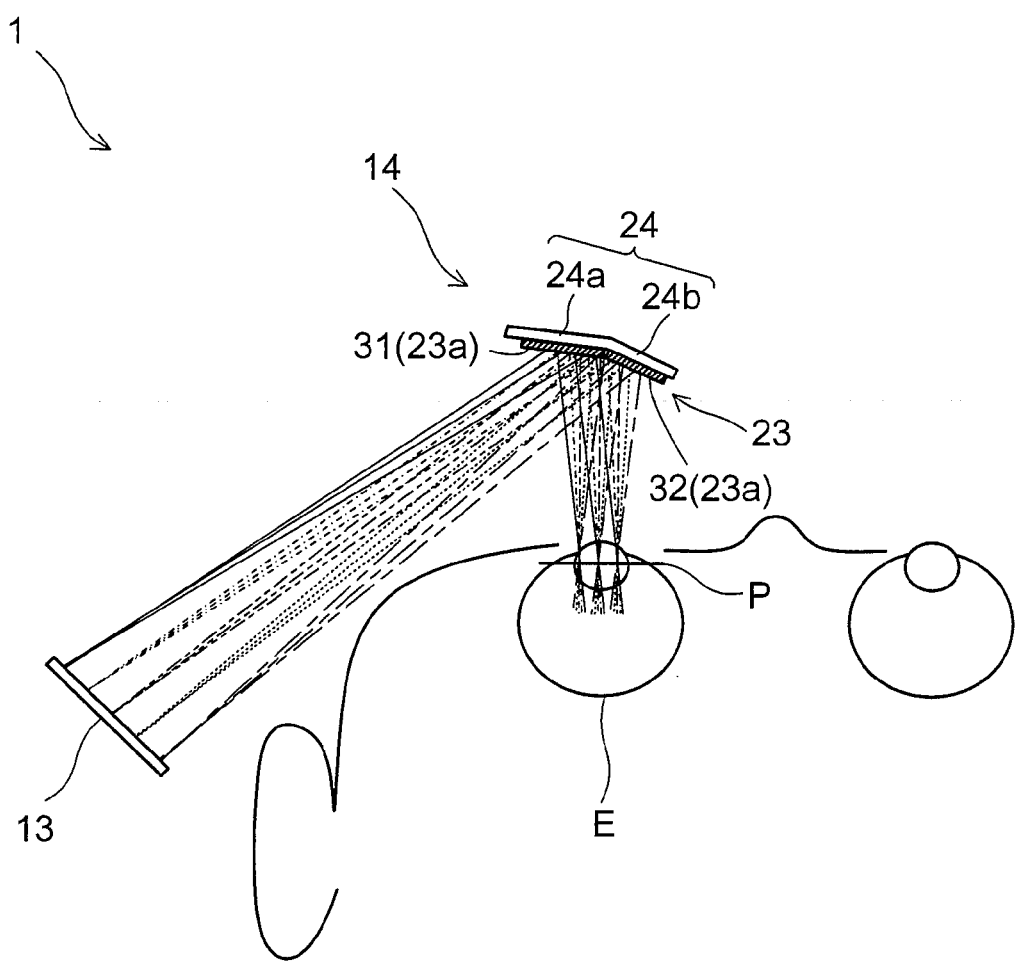
FIG. 11 is a sectional view showing an outline of the configuration of a video display device according to yet another embodiment of the invention.

FIG. 11 is a sectional view showing an outline of the configuration of a video display device 1 according to this embodiment. In FIG. 11, for convenience' sake, the light source and the illumination optical system are omitted. The video display device 1 according to this embodiment is a see-through video display device that has a display element 13 arranged by the side of the observer's face. That is, an HOE 23 is arranged in front of the observer's eye; it, on one hand, diffraction-reflects image light traveling in the horizontal direction from beside the observer's face to direct it to the observer's pupil and, on the other hand, transmits light from the outside world to direct it to observer's pupil. Thus, in this embodiment, the principal plane that includes the optical axes of both the incident light and the emergent light with respect to the HOE 23 is a plane (horizontal plane) perpendicular to the up/down direction, and the HOE surface 23a is so shaped as to be symmetric in the up/down direction about the principal plane as the plane of symmetry.

In this embodiment, the HOE surface 23a is divided into a plurality of flat faces only in a direction parallel to the principal plane. The direction parallel to the principal plane here is the direction parallel to the intersection line between the principal plane and the HOE surface 23a.

Specifically, the HOE surface 23a is composed of two flat faces divided in the horizontal direction, namely a first flat face 31 and a second flat face 32. The first flat face 31 is located closer, than the second flat face 32, to the display element 13 in the horizontal direction. Moreover, so that the HOE surface 23a may be, as a whole (or within the principal plane), concave toward the observation pupil P, the first flat face 31 is arranged with an inclination in the direction parallel to the principal plane with respect to the plane parallel to the observation pupil P, and the second flat face 32 is arranged with an inclination in the direction parallel to the principal plane with respect to the first flat face 31.

The HOE 23 is formed on a substrate 24. The substrate 24 is a plate-form substrate having a constant thickness in the direction perpendicular to the HOE surface 23a, and has a first region 24a and a second region 24b which correspond to the first flat face 31 and the second flat face 32 of the HOE surface 23a. The substrate 24 needs to have such a thickness as not to spoil the see-through property (not to distort the outside world observed).

All the regions (first and second regions 24a and 24b) on the substrate 24 are arranged with an inclination in the direction parallel to the principal plane such that the order-0 diffraction light (regular reflection light) produced on the first and second flat faces 31 and 32 of the HOE 23 held on the substrate 24 deviates from the optical path toward the observation pupil P. The substrate 24 may be composed of a combination of flat plates corresponding to the first and second flat faces 31 and 32, that is, a combination of a substrate having the first region 24a and a substrate having the second region 24b.

With a configuration where, as in this embodiment, the HOE surface 23a is divided into a plurality of flat faces (first and second flat faces 31 and 32) in the direction parallel to the principal plane and the substrate 24 holds the HOE 23 such that the order-0 diffraction light produced on the first and second flat faces 31 and 32 deviates from the optical path toward the observation pupil P, it is possible to avoid ghosts resulting from surface reflection on the HOE 23. In particular, in a case where a plate-form substrate 24 is used as the substrate for holding the HOE 23, while the eyepiece optical system 14 can be made slim, ghosts tend to appear due to surface reflection on the HOE 23 and reflection on the reverse face of the substrate 24. Thus, the configuration according to this embodiment, where the HOE surface 23a is arranged in a divided form, is very effective.

In a configuration where the substrate 24 is arranged with an inclination in the direction parallel to the principal plane, the maximum diffraction angle in the direction parallel to the principal plane tends to be large. By arranging the HOE surface 23a in a form divided into a plurality of flat faces as in this embodiment, it is possible to hold the maximum diffraction angle in the direction parallel to the principal plane small with part of the flat faces (for example, the second flat face 32). Thus, even with a configuration where the substrate 24 is arranged with an inclination in the direction parallel to the principal plane, it is possible to keep the chromatic aberration due to dispersion low, and to allow the observer to observe a high-resolution image.

In a case where the display element 13 has, for example, a vertically elongate rectangular display area, the division direction (the direction parallel to the principal plane) of the HOE surface 23a is the direction with the narrower observation angle of view (the horizontal direction). Even in this case, by dividing the HOE surface 23a in the direction parallel to the principal plane, it is possible to keep small the maximum diffraction angle in the direction with the narrower observation angle of view. Thus, even in a case where a wider angle of view is sought in the direction with the narrower observation angle of view, it is possible to reduce lateral chromatic aberration to allow the observer to observe a high-definition image.

The maximum diffraction angle on the HOE 23 depends on the observation angle of view and the size of the observation pupil P. Thus, by dividing the HOE surface 23a in the horizontal direction, in which the observation angle of view is narrow, and thereby keeping the maximum diffraction angle small in the direction with the narrower observation angle of view, it is possible to form the observation pupil P in a large size in the horizontal direction. The observer's interpupillary distance (the position of the observation pupil relative to the frame) varies from one individual to another, and thus, by forming the observation pupil P in a large size in the horizontal direction, it is possible to provide a device that allows more people to observe the image comfortably.

During the fabrication of the HOE 23 (during the exposure of the holographic photosensitive material), it is preferable that an anti-reflection coating or an anti-reflection film be applied on the surface of the holographic photosensitive material and on the surface of the substrate 24. This is because, during exposure, surface reflection light on the holographic photosensitive material, or obverse-face and reverse-face reflection light on the substrate 24, causes unnecessary interference fringes to be recorded on the holographic photosensitive material, and this produces ghosts and flare in the observed image and thereby degrades image quality.

Embodiment 4

Still another embodiment of the present invention will be described below with reference to the accompanying drawings. For convenience' sake, such components as find their counterparts in Embodiments 1 to 3 are identified by common reference signs, and no overlapping description will be repeated.

Figure 12:
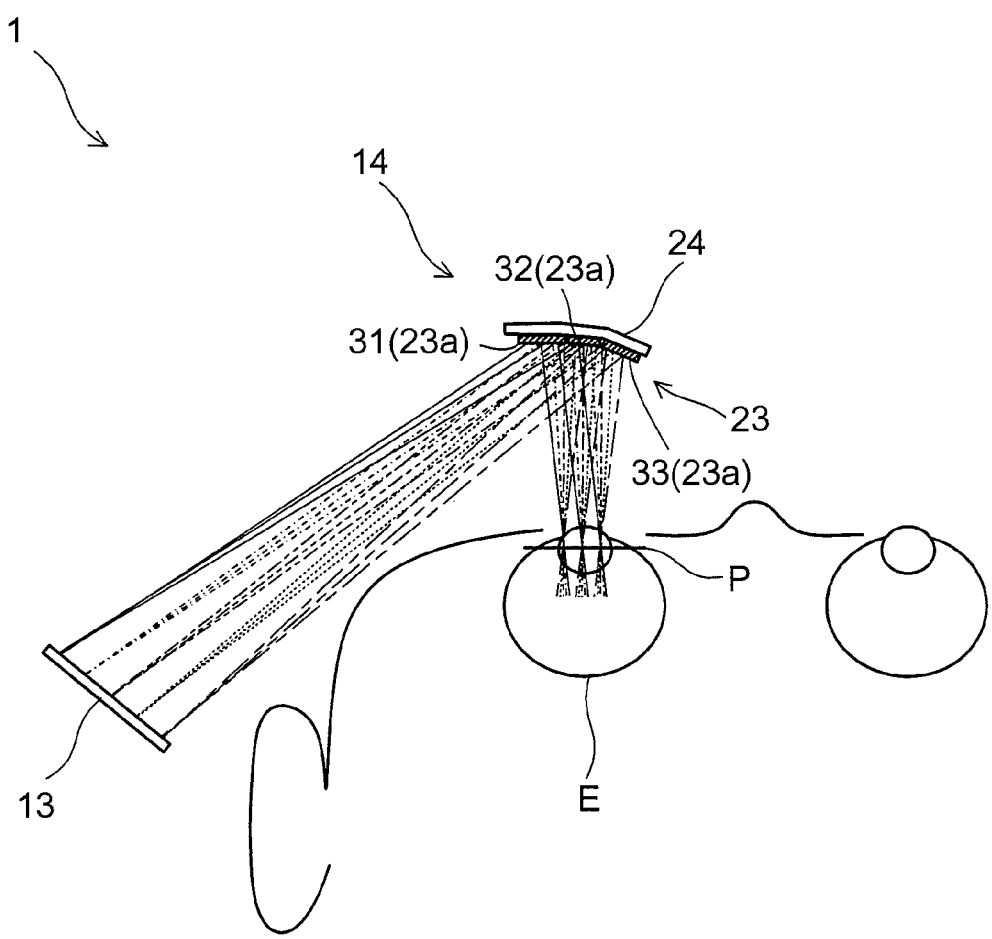
FIG. 12 is a sectional view showing an outline of the configuration of a video display device according to still another embodiment of the invention.

FIG. 12 is a sectional view showing an outline of the configuration of a video display device 1 according to this embodiment. In FIG. 12, for convenience' sake, the light source and the illumination optical system are omitted. The video display device 1 according to this embodiment differs from the configuration according to Embodiment 3 in that the display element 13 is arranged with the display area laterally elongate and that the HOE surface 23a is divided into three flat faces in the direction parallel to the principal plane.

Specifically, the HOE surface 23a is composed of three flat faces divided in the horizontal direction, namely a first flat face 31, a second flat face 32, and a third flat face 33. In the horizontal direction, the first flat face 31 is located closer, than the third flat face 33, to the display element 13, and between the first flat face 31 and the third flat face 33, the second flat face 32 is located. Moreover, so that the HOE surface 23a may be, as a whole (or within the principal plane), concave toward the observation pupil P, the second flat face 32 is arranged with an inclination in the direction parallel to the principal plane with respect to the first flat face 31, and the third flat face is arranged with an inclination in the direction parallel to the principal plane with respect to the second flat face 32.

By increasing the number of flat faces into which the HOE surface 23a is divided, it is possible to keep even smaller the maximum diffraction angle in end parts of the angle of view with the third flat face 33, and thus it is possible to further suppress degradation in image quality ascribable to lateral chromatic aberration resulting from dispersion on the HOE 23.

Embodiment 5

A further embodiment of the present invention will be described below with reference to the accompanying drawings. For convenience' sake, such components as find their counterparts in Embodiments 1 to 4 are identified by common reference signs, and no overlapping description will be repeated. This embodiment deals with a head-up display (HUD) to which the video display device 1 according to Embodiment 3 or 4 described previously can be applied.

Figure 13:
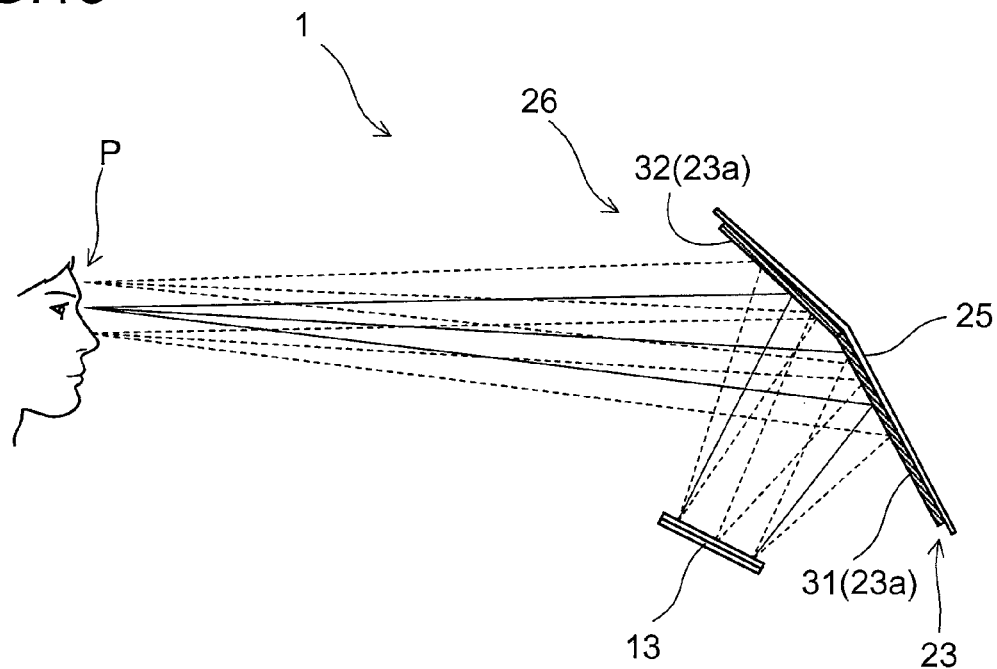
FIG. 13 is a sectional view showing an outline of the configuration of an HUD according to a further embodiment of the invention.

FIG. 13 is a sectional view showing an outline of the configuration of an HUD according to this embodiment. In FIG. 13, for convenience' sake, the light source and the illumination optical system are omitted. In the HUD according to this embodiment, the display element 13 of the video display device 1 is arranged, for example, inside the dashboard of a vehicle, and a flat plate-form substrate 25 arranged in front of the eye, within the field of view, of the observer (driver) holds an HOE 23. Thus, the HOE 23 can be used as a combiner that directs the image light from the display element 13 and light from the outside world simultaneously to the observation pupil P. In this embodiment, the HOE 23 and the substrate 25 constitute an observation optical system 26 which directs the image light from the display element 13 to the observation pupil P and thereby allows the observer to observe a virtual image at the position of the observation pupil P.

In this embodiment, the image light from the display element 13, while traveling from below up, is diffraction-reflected by the HOE 23 so as to be incident on the observation pupil P. Thus, the principal plane mentioned above is a plane perpendicular to the horizontal direction, and the HOE 23 is formed to be symmetric left to right about the principal plane as the plane of symmetry.

The HOE surface 23a is divided into a plurality of flat faces only in the up/down direction parallel to the principal plane. In this embodiment, the HOE surface 23a is composed of two flat faces divided in the up/down direction, namely a first flat face 31 and a second flat face 32. The first flat face 31 is located closer, than the second flat face 32, to the display element 13 in the up/down direction. Moreover, so that the HOE surface 23a may be, as a whole (or within the principal plane), concave toward the observation pupil P, the second flat face 32 is arranged with an inclination in the direction parallel to the principal plane with respect to the first flat face 31.

The substrate 25 is a plate-form substrate having a constant thickness in the direction perpendicular to the HOE surface 23a. All the regions of the substrate 25 corresponding to the first and second flat faces 31 and 32 are arranged with an inclination in the direction parallel to the principal plane such that the order-0 diffraction light (regular reflection light) produced on the HOE 23 deviates from the optical path toward the observation pupil P.

In the HUD, since the HOE 23 is formed in a wide area, it is preferable to use a method of fabricating the HOE 23 by exposing the holographic photosensitive material on different flat faces of the HOE surface 23a sequentially. It is, however, also possible to fabricate the HOE 23 by exposing the holographic photosensitive material on all flat faces simultaneously by use of a large-size exposure optical system.

As in Embodiments 3 and 4, also in this embodiment, to avoid ghost images due to order-0 diffraction light on the HOE 23 and reverse-face reflection light on the substrate 25, the substrate 25 which holds the HOE 23 is arranged with an inclination such that order-0 diffraction light etc. deviate from the optical path toward the observation pupil P. With this configuration, the diffraction angle at the upper end of the angle of view is comparatively large, and thus comparatively large lateral chromatic aberration results from dispersion.

However, by dividing the HOE surface 23a into a plurality of flat faces that are concave toward the observation pupil P as in this embodiment, it is possible to keep small the diffraction angle (the deviation between the diffraction angle and the regular reflection angle) on the HOE 23 at the upper end of the angle of view, and thus it is possible to keep small the lateral chromatic aberration resulting from dispersion on the HOE 23.

When the diffraction angle on the HOE 23 at the upper end of the angle of view is set smaller than the regular reflection angle, the observer with his head lowered may observe a ghost image due to regular reflection light. In that case, by shielding the ghost light with a component member, such as a housing, arranged in the optical path, it is possible to prevent the ghost image from being observed.

Embodiment 6

A further embodiment of the present invention will be described below with reference to the accompanying drawings. For convenience' sake, such components as find their counterparts in Embodiments 1 to 5 are identified by common reference signs, and no overlapping description will be repeated. This embodiment deals with a head-mounted display (HMD) to which the video display device 1 according to Embodiment 1 or 2 described previously can be applied.

Figure 14:
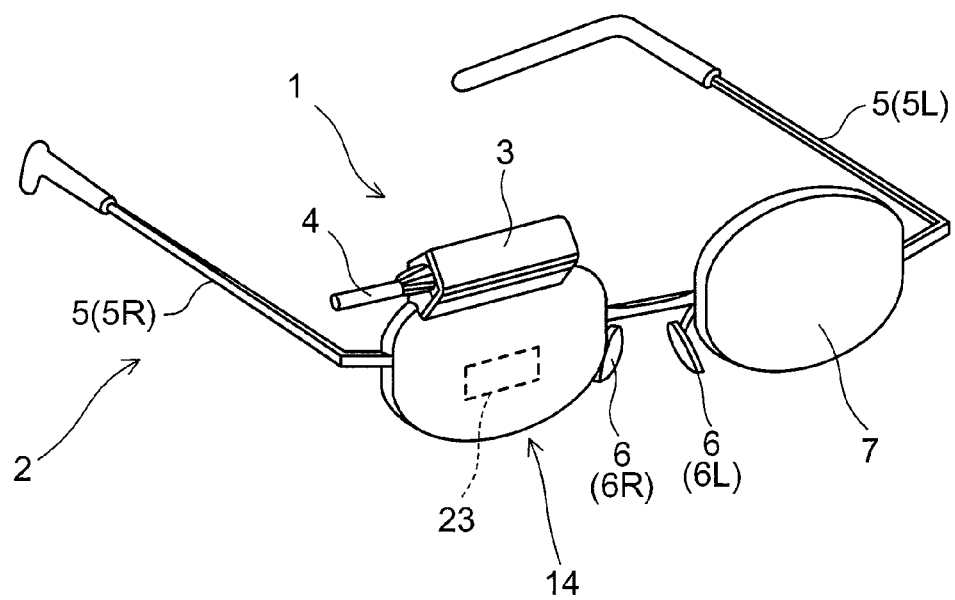
FIG. 14 is a sectional view showing an outline of the configuration of an HMD according to a further embodiment of the invention.

FIG. 14 is a sectional view showing an outline of the configuration of the HMD according to this embodiment. The HMD is composed of the video display device 1 according to Embodiment 1 or 2 described previously and a support member 2.

The video display device 1 has a housing 3 which houses the light source 11, the illumination optical system 12, and the display element 13 described previously (for all these, see FIG. 1 etc.). The housing 3 holds part of the eyepiece optical system 14. The eyepiece optical system 14 is composed of the eyepiece prism 21 and the deflecting prism 22 described previously bonded together, and is as a whole shaped like one lens (in FIG. 14, the lens for the right eye) of a pair of spectacles. The video display device 1 further has a circuit board (not shown) for supplying the light source 11 and the display element 13 with at least driving electric power and a video signal via a cable 4 provided through the housing 3.

The support member 2 is a support mechanism which corresponds to the frame of the spectacles, and supports the video display device 1 in an accurate position in front of the observer's eye (for example, in front of his right eye). The support member 2 includes temples 5 (a right temple 5R and a left temple 5L) that make contact with left and right side parts of the observer's head, nose pads 6 (a right nose pad 6R and a left nose pad 6L) that make contact with the observer's nose, and a nose pad locking unit (not shown) that keeps the nose pads 6 fixed in a predetermined position. The nose pad locking unit holds the nose pads 6 by resilient bars, and permits adjustment of the inclination of the nose pads 6. The support member 2 further has a dummy lens which is arranged in front of the observer's left eye.

The observer, while holding the temples 5 of the support member 2 and moving the eyepiece optical system 14, makes an overall position adjustment so that the position of the observation pupil of the eyepiece optical system 14 coincides with the position of the observer's pupil, then fixes the nose pads 6 by the nose pad locking unit, and thereby mount the HMD on the head. In this state, when an image is displayed on the display element 13, the observer can observe an enlarged virtual image of the image displayed on the video display device 1, and can simultaneously observe the outside world through the eyepiece optical system 14 in a see-through fashion.

Owing to the video display device 1 being supported by the support member 2 in this way, the observer can observe the image provided by the video display device 1 for a long time stably in a hands-free fashion, and can enjoy satisfactory image observation for a long time.

A configuration is also possible which uses two video display devices 1 so that the image can be observed with both eyes. In that case, it is necessary to provide an adjustment mechanism (not shown) for adjusting the distance (interpupillary distance) between the two eyepiece optical systems.

The video display devices 1 according to Embodiments 7-9 described later can also be applied to the HMD according to this embodiment.

Embodiment 7

A further embodiment of the present invention will be described below with reference to the accompanying drawings. For convenience' sake, such components as find their counterparts in Embodiments 1 to 6 are identified by common reference signs, and no overlapping description will be repeated.

(HOE Surface)

Figure 15:
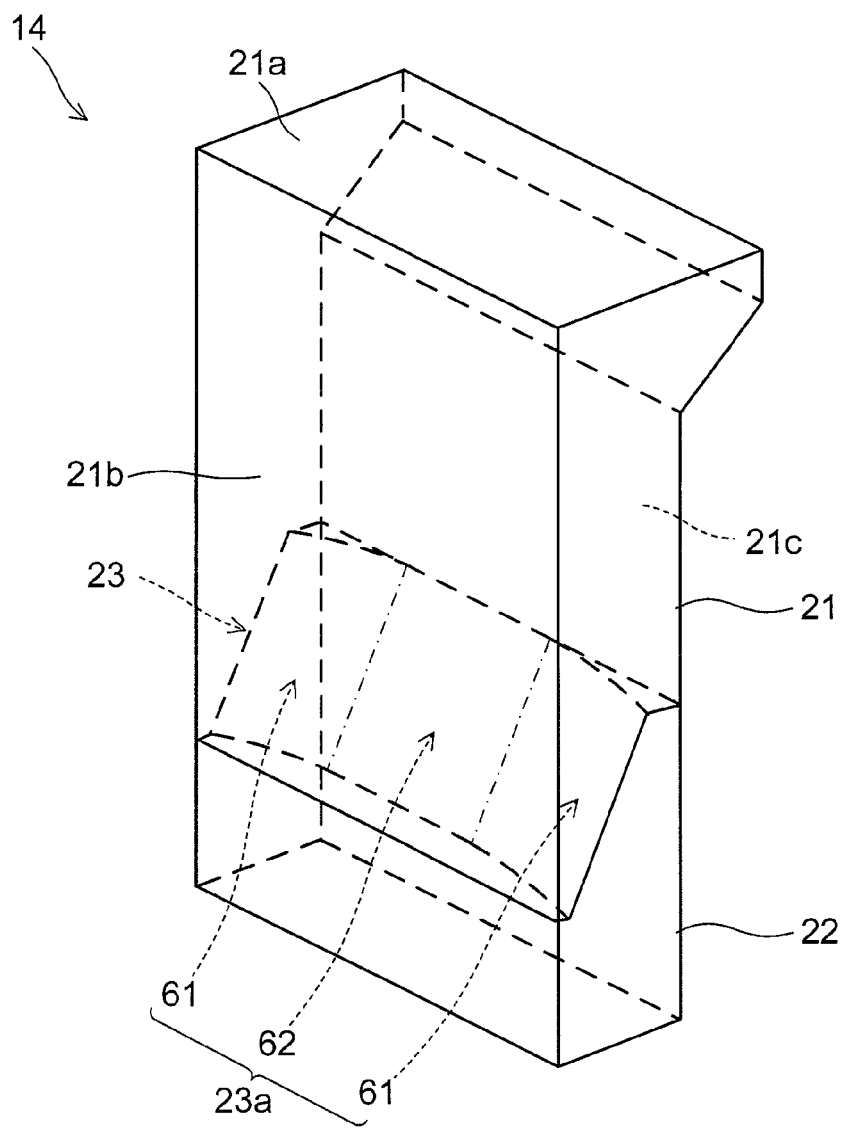
FIG. 15 is a perspective view of an eyepiece optical system in a video display device according to a further embodiment of the invention.
Figure 16:
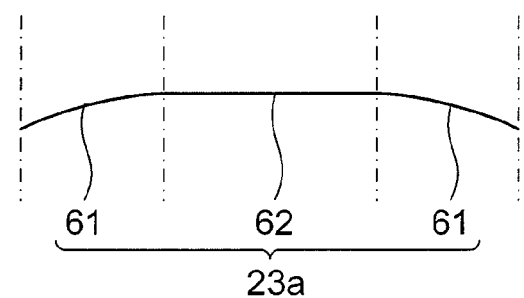
FIG. 16 is a diagram schematically illustrating the shape of an HOE surface in the eyepiece optical system within a horizontal plane.

FIG. 15 is a perspective view of an eyepiece optical system 14 in a video display device 1 according to this embodiment. FIG. 16 is a diagram schematically illustrating the shape, within a horizontal plane, of an HOE surface 23a in the eyepiece optical system 14. The video display device 1 according this embodiment differs from the video display device 1 shown in FIG. 1 in that the eyepiece optical system 14 in the latter is replaced with an eyepiece optical system 14 shown in FIG. 15. In this embodiment, the HOE surface 23a in the eyepiece optical system 14 is composed of two curved faces 61 and one tangent flat face 62 contiguous with it.

The curved faces 61 are each a curved face that has a curvature only in one direction (here, in the left/right direction) and that is concave toward the observation pupil P. In this embodiment, each curved face 61 has a curvature only within a horizontal plane, and is composed of a cylindrical surface having a constant curvature. The tangent flat face 62 is a flat face tangent to the curved faces 61, and is located between the curved faces 61 so as to be contiguous with the curved faces 61. A tangent flat face denotes a flat face that includes all lines tangent to a curved face at one point on the curved face.

The HOE 23 is formed on the face 21d (see FIG. 1) of the eyepiece prism 21, and the HOE surface 23a is formed along the face 21d. Thus, by composing the face 21d of the eyepiece prism 21 of curved faces and a flat face tangent to them, it is possible to form the HOE surface 23a mentioned above.

The HOE surface 23a is shaped symmetric left to right about the principal plane as the plane of symmetry. The two curved faces 61 and the tangent flat face 62 constituting the HOE surface 23a are arranged side by side in the left/right direction, which is perpendicular to the principal plane. Here, the tangent flat face 62 is so arranged as to cross the principal plane, and the curved faces 61 are arranged on both sides of the tangent flat face 62 in the left/right direction, which is perpendicular to the principal plane, so as to be contiguous with the tangent flat face 62. Since the curved faces 61 have a curvature within the horizontal plane, they can be said to have a curvature in the direction perpendicular to the principal plane.

In this embodiment, the rays (referred to as the principal rays) emanating from the center of the display area of the display element 13 and traveling toward the center of the observation pupil P are diffracted on the HOE surface 23a (in particular, on the tangent flat face 62) at an angle close to that of regular reflection. Here, the difference $\Delta\theta$ in diffraction angle between order-0 diffraction light (regular reflection light) and order-1 diffraction light fulfills the formula $\Delta\theta < 3°$.

By, as described above, composing the HOE surface 23a of curved faces 61 having a curvature only in one direction and concave toward the observation pupil and a flat face tangent to and contiguous with those curved faces, with respect to the image light near the center of the angle of view, that is, the image light diffracted at small angles in any event when the HOE surface 23a is a flat surface, it is possible to diffract it with the tangent flat face 62 to reduce the diffraction angle (to make it closer to the regular reflection angle), and with respect to the image light in end parts of the angle of view, that is, the image light diffracted at large angles when the HOE surface 23a is a flat surface, it is possible to diffract it with the curved faces 61 to reduce the diffraction angle (to make it closer to the regular reflection angle). Thus, even when a wider angle of view is sought, it is possible to keep the lateral chromatic aberration resulting from dispersion on the HOE 23 low over the entire image area, and thus to allow the observer to observe a high-definition image that has a wide angle of view but nevertheless has a high resolution.

Moreover, by, as described above, diffracting not all the image light within the image area but only part of the image light with the curved face 61, it is possible to reduce the diffraction angle of the image light over the entire image area without increasing the curvature of the curved faces 61, and thereby to keep the lateral chromatic aberration resulting from dispersion on the HOE 23 low. Thus, as compared with in a case where the entire HOE surface 23a is composed of a cylindrical surface having a constant curvature, it is possible to reduce the amount of protrusion of the entire HOE surface 23a to its convex side (the amount of protrusion to the side opposite from the observation pupil P), and to form the eyepiece optical system 14 slim.

Moreover, when the HOE surface 23a is composed of curved faces 61 and a tangent flat face 62, only in a partial region, that is, only in the region where the diffraction angle is large when the HOE surface 23a is a flat surface (the region where the diffraction angle needs to be reduced), the HOE surface 23a has curved faces 61; in the other region, that is, in the region where the diffraction angle is small in any event when the HOE surface 23a is a flat surface, a flat face (tangent flat face 62) can be used as it is. Thus, it is possible to obtain the benefits mentioned above without giving the HOE surface 23a a complicated shape.

Moreover, the HOE surface 23a is formed in a shape symmetric left to right about the principal plane as the plane of symmetry, the tangent flat face 62 is arranged so as to cross the principal plane, and the curved faces 61 have a curvature in the direction perpendicular to the principal plane and are arranged on both sides of the tangent flat face 62 in the direction perpendicular to the principal plane. Thus, even in a configuration where, as in this embodiment, the video display device 1 guides the image light from the display element 13 in the up/down direction to direct it via the HOE 23 to the observation pupil P, it is possible to obtain the benefits mentioned above reliably.

That is, for example, in a case where the entire HOE surface 23a is a flat surface, the image light incident on a region of the HOE surface 23a near the principal plane (a region near the center of the display area of the display element 13) is diffracted at small angles in any event, and the image light incident on a region far from the principal plane (a region far from the center of the display area of the display element 13) is diffracted at large angles. Accordingly, by composing the HOE surface 23a of two curved faces 61 and one tangent flat face 62 and arranging the curved faces 61 and the tangent flat face 62 as described above, it is possible, for the image light incident on a region of the HOE surface 23a near the principal plane, to reduce the diffraction angle by diffraction at the tangent flat face 62 and, for the image light incident on a region of the HOE surface 23a far from the principal plane, to reduce the diffraction angle by diffraction at the curved faces 61. Thus, with in a configuration where the image light is guided in the up/down direction, it is possible to reliably keep small the lateral chromatic aberration resulting from dispersion on the HOE 23 over the entire image area.

Moreover, in this embodiment, since the longer-side direction of the display surface of the display element 13 is aligned with the horizontal direction, the observation angle of view is wider in the horizontal direction than in the up/down direction. The horizontal direction mentioned above is a direction perpendicular to the principal plane, and the curved faces 61 constituting the HOE surface 23a have a curvature only in one direction; thus, the curved face 61 can be said to have a curvature in, of two directions in which the angle of view differs, the one with the wider angle of view (within a horizontal plane that includes the direction with the wider angle of view).

Owing to the curved faces 61 having a curvature in the direction with the wider angle of view in this way, it is possible to diffract with the curved faces 61 the image light in end parts of the angle of view in the direction with the wider angle of view, and thereby to reduce the diffraction angle. Thus, even in a case where a wider angle of view is sought in the direction with the wider angle of view, it is possible to keep the lateral chromatic aberration resulting from dispersion on the HOE 23 small over the entire image area.

Moreover, in this embodiment, the curved faces 61 of the HOE surface 23a are composed of a cylindrical surface having a constant curvature. Thus, with a combination of a flat surface (tangent flat face 62) and a cylindrical surface (curved faces 61), the HOE surface 23a can be formed easily.

Moreover, in this embodiment, as described above, the deflecting prism 22 is provided opposite the eyepiece prism 21 across the HOE 23. Providing the deflecting prism 22 permits the order-0 diffraction light on the HOE 23 to be transmitted through the deflecting prism 22 and deviate from the optical path toward the observation pupil P. This helps reduce surface reflection on the surface of on the HOE 23 and thereby suppress observation of a ghost image due to regular reflection light (order-0 diffraction light). Moreover, in a configuration where the display image on the display element 13 is overlaid on the outside world for see-through observation, the deflecting prism 22 prevents refraction of light from the outside world on the surface of the HOE 23. Thus, the observer can observe a natural outside world without distortion. Thus, the deflecting prism 22 functions as a correction prism for satisfactorily correcting the observed image and the image of the outside world.

(Fabrication of HOE)

Also in this embodiment, as in Embodiment 1, the HOE 23 can be fabricated by exposing a holographic photosensitive material 23p to two light beams by use of the exposure optical system shown in FIG. 7. In particular in a case where, as in this embodiment, the HOE surface 23a is composed of curved faces 61 and a tangent flat face 62 and the curved faces 61 are so shaped as to have a curvature only in one direction, the HOE 23 can be fabricated by use of a single continuous holographic photosensitive material 23p, and can thus be fabricated easily.

Figure 17:
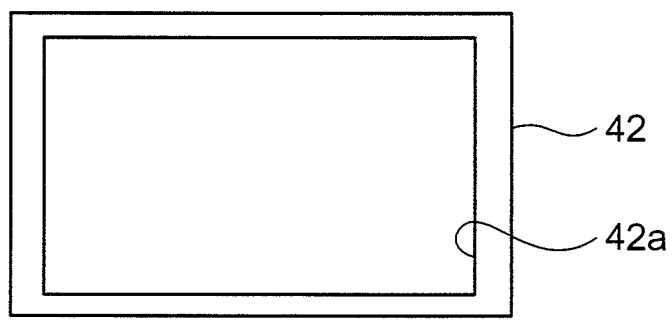
FIG. 17 is a plan view of an exposure mask used in an exposure optical system for fabricating the holographic optical element in the video display device.

FIG. 17 is a plan view of an exposure mask 42 arranged in the optical path between the point light sources 41 and the eyepiece prism 21 in FIG. 7. The exposure mask 42 has an opening 42a, and the reference beam from the point light sources 41 is shone through the opening 42a in the exposure mask 42 onto the holographic photosensitive material 23p. Thus, the exposure mask 42 functions as an aperture stop for restricting the region in which the holographic photosensitive material 23p is irradiated with the reference beam, and thus the effective region of the HOE 23 can be said to be restricted by the aperture stop (exposure mask 42) in the optical path of the exposure optical system for exposing the holographic photosensitive material 23p.

Thus, of the HOE 23, only the region where the interference fringes are formed by exposure functions as an effective region having such optical characteristics as to diffract incident light. For example, in this embodiment, if an attempt is made to restrict the effective region of the HOE 23 only with the exterior shape (size) of the holographic photosensitive material 23p, the edge of the holographic photosensitive material 23p produces flare and degrades image quality.

By contrast, by restricting the effective region of the HOE 23 with an aperture stop (exposure mask 42) in the optical path of the exposure optical system as in this embodiment, it is possible to form an effective region of the HOE 23 inward of the region where the holographic photosensitive material 23p is formed. This makes it possible to prevent the effective region of the HOE 23 from including the edge of the holographic photosensitive material 23p, and thus it is possible to avoid degradation in image quality due to the edge of the holographic photosensitive material 23p.

Moreover, by arranging the exposure mask 42 in the optical path, it is possible to form the HOE 23 with a single exposure optical system. That is, by arranging the exposure mask 42 and exposing the holographic photosensitive material 23p, it is possible to form the regions of the HOE surface 23a having the curved faces 61 and the tangent flat face 62 simultaneously. Consequently, as compared with in a case where the regions of the HOE surface 23a having the curved faces 61 and the tangent flat face 62 are formed sequentially by separate exposure using separate masks corresponding to the individual faces, it is possible to simplify the fabrication process.

Embodiment 8

A further embodiment of the present invention will be described below with reference to the accompanying drawings. For convenience' sake, such components as find their counterparts in Embodiments 1 to 7 are identified by common reference signs, and no overlapping description will be repeated.

Figure 18:
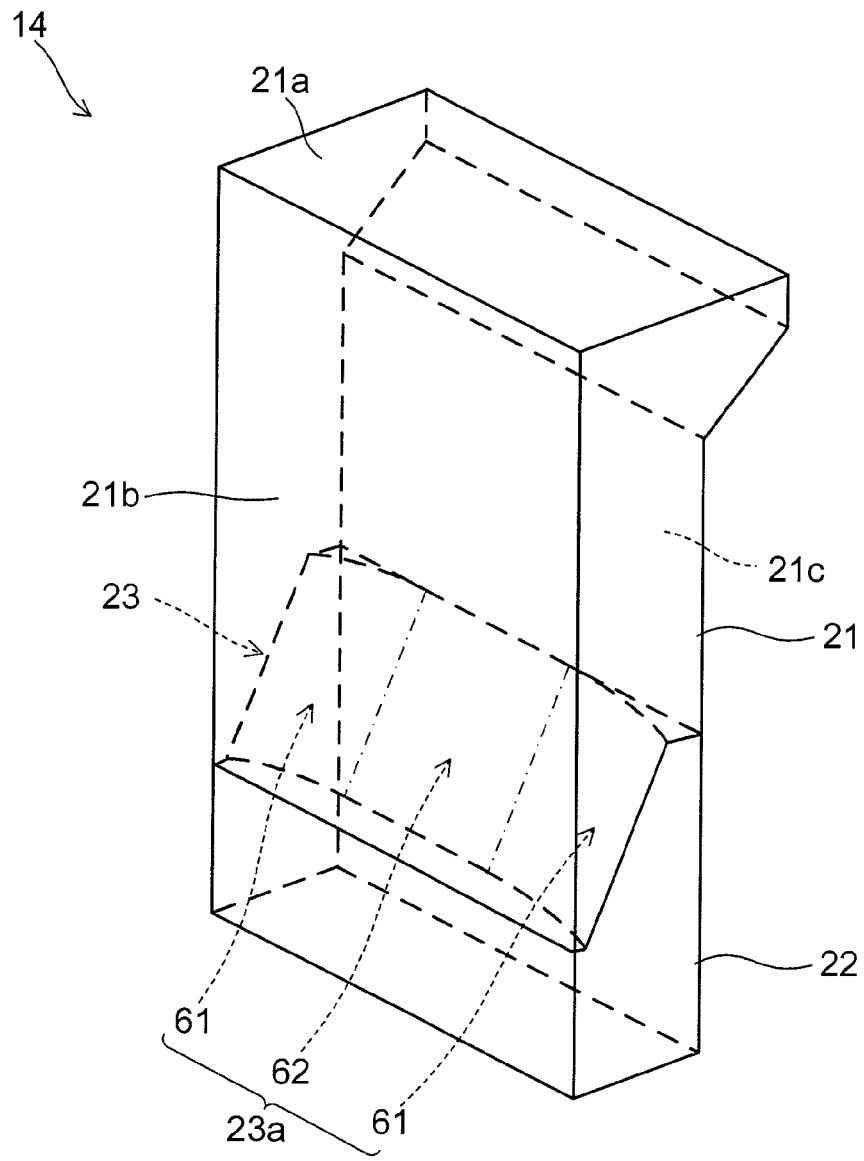
FIG. 18 is a perspective view of an eyepiece optical system in a video display device according to a further embodiment of the invention.
Figure 19:
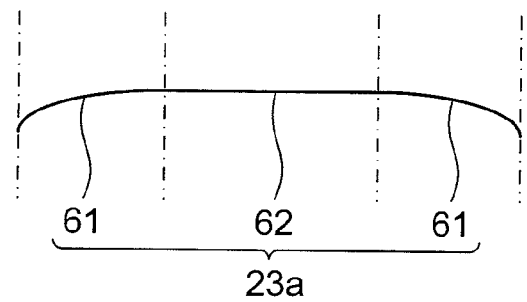
FIG. 19 is a sectional view schematically showing the shape of an HOE surface in the eyepiece optical system within a horizontal plane.

FIG. 18 is a perspective view of an eyepiece optical system 14 in a video display device 1 according to this embodiment, and FIG. 19 is a sectional view schematically showing the shape of an HOE surface 23a in the eyepiece optical system 14 within a horizontal plane. The video display device 1 according to this embodiment differs from the video display device 1 shown in FIG. 1 in that the eyepiece optical system 14 in the latter is replaced with the eyepiece optical system 14 in FIG. 18.

The video display device 1 according to this embodiment is similar to that according to Embodiment 7 except that, here, the curved faces 61 constituting the HOE surface 23a and concave toward the observation pupil P are each composed of a surface whose curvature increases (whose radius of curvature decreases) the farther away from the tangent flat face 62. That is, the curvature of each of the curved faces 61 that are arranged on the left and right sides of the tangent flat face 62 so as to be contiguous with it increases the farther away from the principal plane. Even when the HOE surface 23a is configured in this way, it is still shaped symmetrically left to right about the principal plane as the plane of symmetry.

With a configuration where, as described above, the curvature of the curved faces 61 constituting the HOE surface 23a is not constant but increases the farther away from the tangent flat face 62, for example, by diffracting the image light, whose diffraction angle increases from the center to end parts of the angle of view, with the curved faces 61 having varying curvatures, it is possible to reduce the diffraction angle of the image light at any angles of view and make it close to the regular reflection angle. This makes it possible to reliably keep the lateral chromatic aberration resulting from dispersion on the HOE 23 low over the entire image area.

Embodiment 9

A further embodiment of the present invention will be described below with reference to the accompanying drawings. For convenience' sake, such components as find their counterparts in Embodiments 1 to 8 are identified by common reference signs, and no overlapping description will be repeated.

Figure 20:
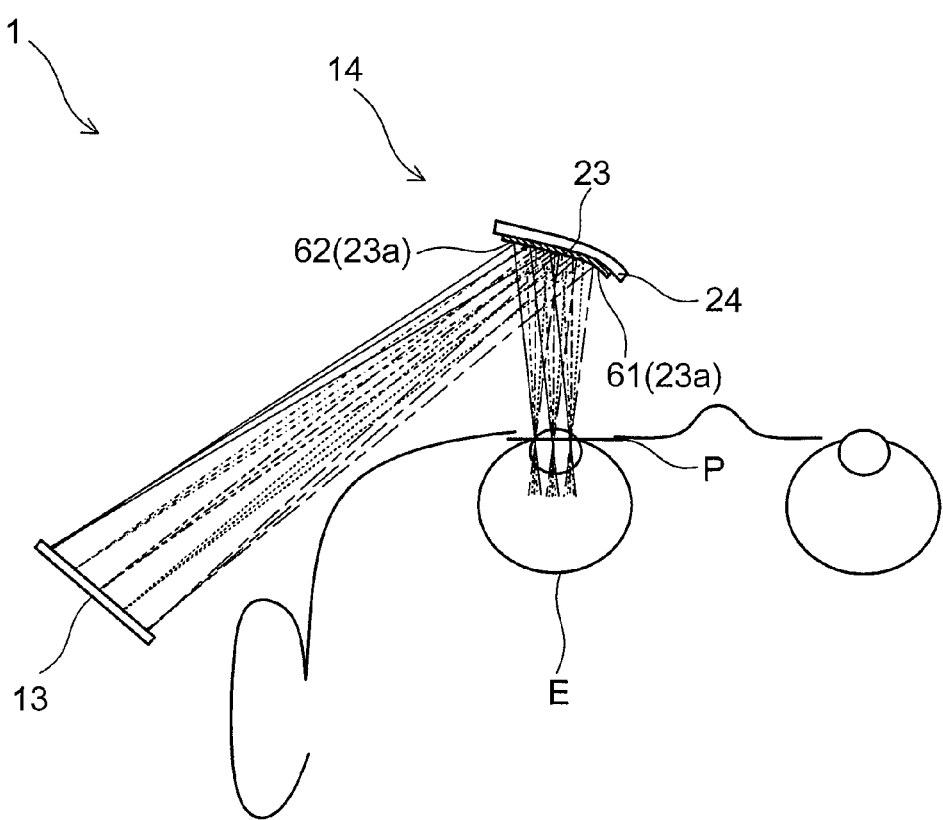
FIG. 20 is a sectional view showing an outline of the configuration of a video display device according to still another embodiment of the invention.

FIG. 20 is a sectional view showing an outline of the configuration of a video display device 1 according to this embodiment. In FIG. 20, for convenience' sake, the light source and the illumination optical system are omitted. The video display device 1 according to this embodiment is a see-through video display device having a display element 13 arranged by the side of the observer's face. That is, an HOE 23 is arranged in front of the observer's eye; it, on one hand, diffraction-reflects image light traveling in the horizontal direction from beside the observer's face to direct it to the observer's pupil and, on the other hand, transmits light from the outside world to direct it to the pupil. Thus, in this embodiment, the principal plane that includes the optical axes of both the incident light and the emergent light with respect to the HOE 23 is a plane (horizontal plane) perpendicular to the up/down direction, and the HOE surface 23a is so shaped as to be symmetric in the up/down direction about the principal plane as the plane of symmetry. In this embodiment, it is assumed that the display element 13 is arranged with its display area laterally elongate.

In this embodiment, the HOE surface 23a is composed of one curved face 61 and one tangent flat face 62 that are contiguous with each other. The curved face 61 is a curved face having a curvature only in one direction and concave toward the observation pupil P. In particular, in this embodiment, the curved face 61 is composed of a cylindrical surface having a constant curvature within a plane parallel to the principal plane (within a horizontal plane), and the tangent flat face 62 is arranged closer, than the curved face 61, to the display element 13. The curved face 61 may instead by composed of a surface whose curvature increases the farther away from the tangent flat face 62.

The HOE 23 is formed on the observation pupil P side surface of the substrate 24, and the HOE 23 and the substrate 24 together constitute an eyepiece optical system 14 (observation optical system). The substrate 24 is a plate-form transparent substrate having a constant width in the direction perpendicular to the HOE surface 23a. The substrate 24 needs to have such a thickness as not to spoil the see-through property (not to distort the outside world observed). The substrate 24 holds the HOE 23 in such a way that all the order-0 diffraction light (regular reflection light) produced on the HOE 23 deviates from the optical path toward the observation pupil P.

By, as in this embodiment, arranging the curved face 61 constituting the HOE surface 23a so as to have a curvature within a plane parallel to the principal plane, and arranging the tangent flat face 62 closer than the curved face 61 to the display element 13, it is possible, with respect to the image light incident on a region of the HOE surface 23a near the display element 13, that is, the image light of which the diffraction angle is small in any event when the HOE surface is a flat surface, to reduce the diffraction angle by diffraction on the tangent flat face 62 and, with respect to the image light incident on a region of the HOE surface 23a far from the display element 13, that is, the image light of which the diffraction angle is large when the HOE surface is a flat surface, to reduce the diffraction angle by diffraction on the curved face 61. In this way, even with a configuration where, as in this embodiment, the video display device 1 directs the image light traveling in the horizontal direction from the display element 13 via the HOE 23 to the observation pupil P, it is possible to keep the lateral chromatic aberration resulting from dispersion on the HOE 23 low over the entire image area.

In particular, with a configuration where the image light travels in a direction parallel to the principal plane, the maximum diffraction angle within a plane parallel to the principal plane tends to be large. Even with such a configuration, it is possible to keep the maximum diffraction angle of the image light small with the curved face 61, to keep the lateral chromatic aberration resulting from dispersion on the HOE 23 low, and to allow the observer to observe a high-definition image.

Moreover, by using as the substrate 24 a plate-form substrate having a constant thickness in the direction perpendicular to the HOE surface 23a, it is possible to configure the eyepiece optical system 14 to be slim and lightweight, and it is thereby possible to reliably realize a video display device 1 that is slim in the direction perpendicular to the plane of the observation pupil P.

Moreover, since the substrate 24 holds the HOE 23 in such a way that all the order-0 diffraction light produced on the HOE 23 deviates from the optical path toward the observation pupil P, it is possible to avoid a ghost image due to surface reflection on the HOE 23, and thus to avoid degradation in image quality ascribable to a ghost image. Moreover, in a case where the substrate 24 holds the HOE 23 in the manner described above to avoid a ghost image, the maximum diffraction angle within a plane parallel to the principal plane tends to be large; thus, the configuration according to this embodiment where the curved face 61 of the HOE surface 23a is given a curvature only within a plane parallel to the principal plane to keep the diffraction angle small is extremely effective in a configuration that employs a plate-form substrate 24.

Although this embodiment deals with an example where the HOE 23 is formed on the observation pupil P side surface of the substrate 24, it is also possible to obtain the above-mentioned benefits of this embodiment by forming the HOE 23 on the surface of the substrate 24 opposite from the observation pupil P.

Although this embodiment deals with an example where the display element 13 is arranged with its display surface laterally elongate, it is also possible to arrange the display element 13 with its display surface longitudinally long and give the curved face 61a curvature only within a plane parallel to the principal plane. With this configuration, the curved face 61 has a curvature in the direction (horizontal direction) with the narrower angle of view. Even in that case, it is possible to keep the maximum diffraction angle in that direction small. Thus, even when a wider angle of view is sought in the direction with the narrower observation angle, it is possible, while suppressing the protrusion of the eyepiece optical system 14 forward, to reduce lateral chromatic aberration and allow the observer to observe a high-resolution image.

Moreover, the maximum diffraction angle on the HOE 23 depends on the observation angle of view and the size of the observation pupil P; thus, by keeping the maximum diffraction angle in the direction with the narrower observation angle of view small, it is possible to form the observation pupil P with a large size in the horizontal direction. The interpupillary distance (the position of the observation pupil relative to the frame) of the observer varies from one individual to another; thus, by forming the observation pupil P with a large size in the horizontal direction, it is possible to realize a device that allows more people to observe the image satisfactorily.

As in Embodiment 1, the HOE 23 is fabricated by exposing a holographic photosensitive material by use of an exposure optical system. The exposure may be performed after the holographic photosensitive material is bonded to the substrate 24; or first a film-form holographic photosensitive material may be exposed so as to be then bonded to the substrate 24.

During the fabrication of the HOE 23 (during the exposure of the holographic photosensitive material), it is preferable that an anti-reflection coating or an anti-reflection film be applied to the surface of the holographic photosensitive material and to the surface of the substrate 24. This be because, otherwise, during exposure, surface reflection light on the holographic photosensitive material or obverse-face and reverse-face reflection light on the substrate 24 records unnecessary interference fringes on the holographic photosensitive material, and this produces ghosts and flare in the observed image, leading to degraded image quality.

Embodiment 10

A further embodiment of the present invention will be described below with reference to the accompanying drawings. For convenience' sake, such components as find their counterparts in Embodiments 1 to 9 are identified by common reference signs, and no overlapping description will be repeated. This embodiment deals with a head-up display (HUD) to which the video display device 1 described above can be applied.

Figure 21:
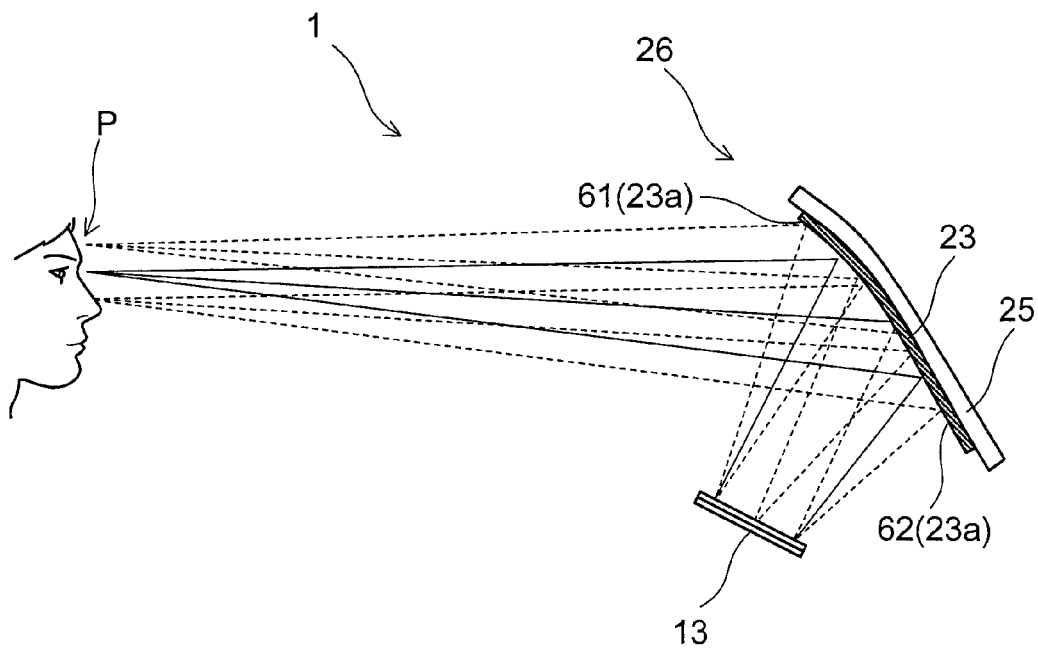
FIG. 21 is a sectional view showing an outline of the configuration of an HUD according to a further embodiment of the invention.

FIG. 21 is a sectional view showing an outline of the configuration of an HUD according to this embodiment. In FIG. 21, for convenience' sake, the light source and the illumination optical system are omitted. In the HUD according to this embodiment, the display element 13 of the video display device 1 is arranged, for example, inside the dashboard of a vehicle, and a flat plate-form substrate 25 arranged in front of the eye, within the field of view, of the user (driver) holds an HOE 23. Thus, the HOE 23 can be used as a combiner that directs the image light from the display element 13 and light from the outside world simultaneously to the observation pupil P. In this embodiment, the HOE 23 and the substrate 25 constitute an observation optical system 26 which directs the image light from the display element 13 to the observation pupil P and thereby allows the observer to observe a virtual image at the position of the observation pupil P.

Here, the substrate 25 is a plate-form substrate having a constant thickness in the direction perpendicular to the HOE surface 23a, and is arranged with an inclination in the direction parallel to the principal plane such that the order-0 diffraction light (regular reflection light) produced on the HOE 23 deviates from the optical path toward the observation pupil P. In this embodiment, the image light from the display element 13, while traveling from below up, is diffraction-reflected by the HOE 23 so as to reach the observation pupil P. Thus, the above-mentioned principal plane is a plane perpendicular to the horizontal direction (the direction perpendicular to the plane of FIG. 21), and therefore the HOE 23 is formed symmetrically in the left/right direction about the principal plane as the plane of symmetry.

The HOE surface 23a is composed of a composite surface of a curved face 61 having a curvature only in one direction and concave toward the observation pupil P and a tangent flat face 62 contiguous with it. The tangent flat face 62 is a flat face tangent to the curved face 61, and is arranged closer (that is, lower) than the curved face 61 to the display element 13. The curved face 61 is composed of, for example, a cylindrical surface having a curvature only within a plane parallel to the principal plane, but may instead be composed of a surface whose curvature increases the farther away from the tangent flat face 62 within that plane.

As in Embodiment 9, also in this embodiment, to avoid a ghost image due to surface reflection light on the HOE 23 and on the substrate 25, the substrate 25 is arranged with an inclination such that no order-0 diffraction light or reverse-face reflection light reaches the observation pupil P. With this configuration, the diffraction angle at the upper end of the angle of view is relatively large, and thus comparatively large lateral chromatic aberration results from dispersion.

However, as in this embodiment, by composing the HOE surface 23a of a curved face 61 and a tangent flat face 62 and setting the positional relationship of the curved face 61 and the tangent flat face 62 as described above, it is possible to keep the diffraction angle on the HOE 23 (the deviation between diffraction angle and the regular reflection angle) small with the curved face 61, and to keep the lateral chromatic aberration resulting from dispersion on the HOE 23 small.

When the diffraction angle on the HOE 23 at the upper end of the angle of view is set smaller than the regular reflection angle, the observer with his head lowered may observe a ghost image due to regular reflection light. In that case, by shielding the ghost light with a component member, such as a housing, arranged in the optical path, it is possible to prevent the ghost image from being observed.

Needless to say, it is possible to configure a video display device 1 and hence an HMD or HUD by combining together different features from different ones of the embodiments described above.

[Practical Example]

Next, a practical example of the video display device 1 according to Embodiment 7 described previously will be described in more detail with reference to its construction data etc. Specifically, Example 1 presented below is a numerical example corresponding to the video display device 1 according to Embodiment 7.

In the construction data presented below, Si (i=1, 2, 3, . . . ) indicates the ith surface as counted from the observation pupil P side (with the observation pupil P assumed to be the first surface). Moreover, of the cover glass (CG) of the display element 13, the eyepiece optical system 14 side face is taken as the CG surface, and the light source 11 side face is taken as the image plane (display surface).

Figure 22:
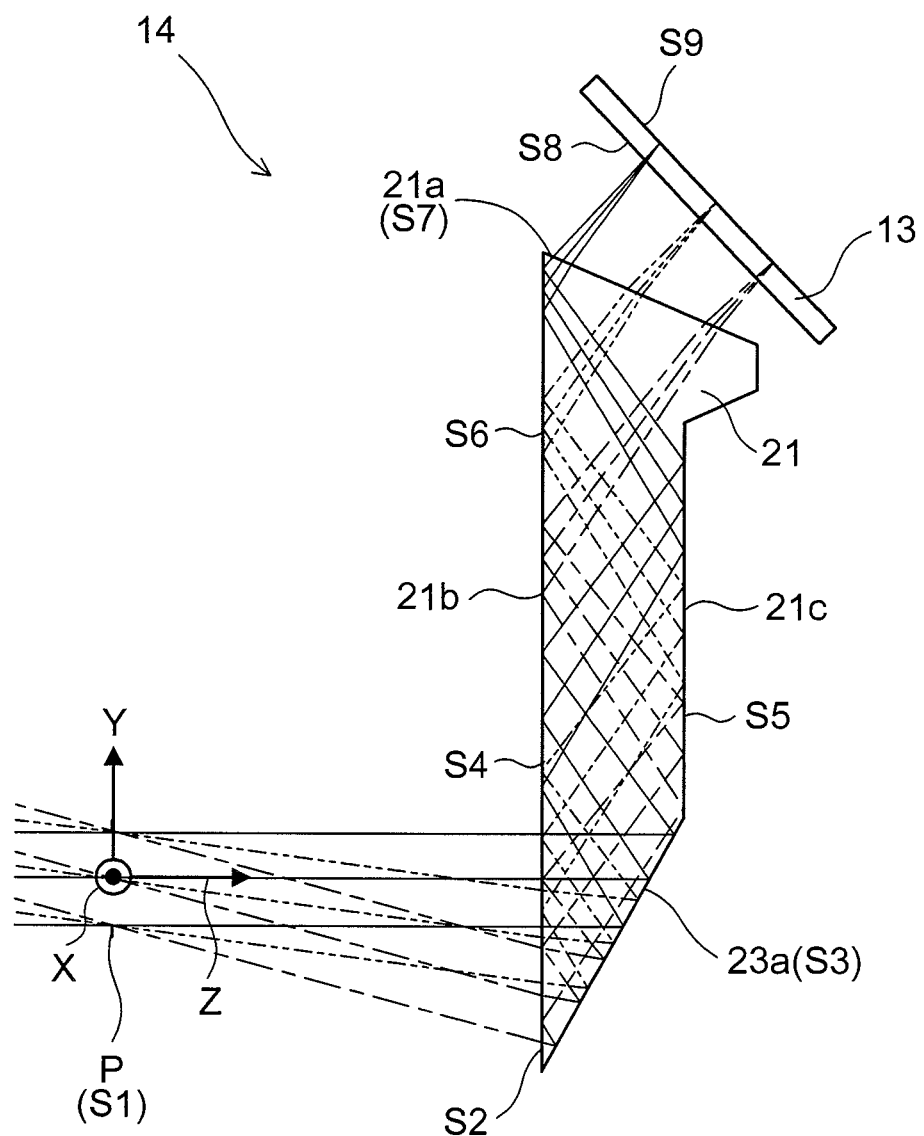
FIG. 22 is a sectional view of a video display device embodying the invention.
Figure 23:
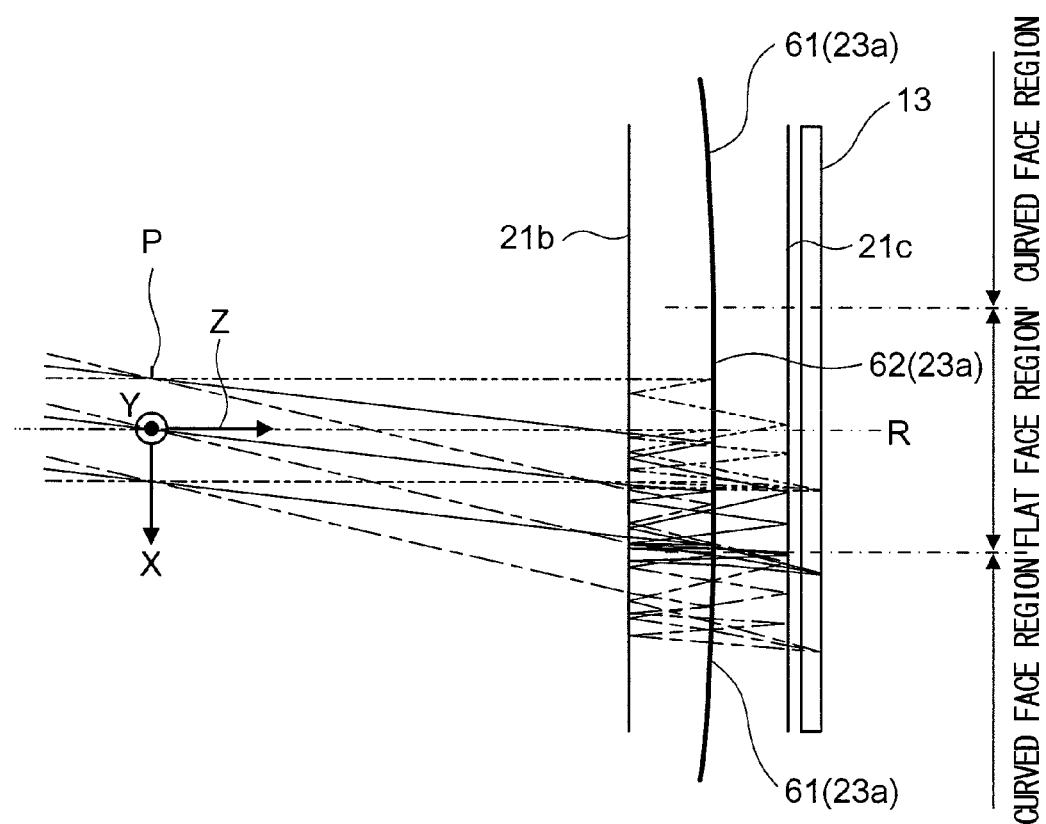
FIG. 23 is a plan view showing the optical path of right-hand image light with respect to the center of the observation angle of view in the video display device.

FIG. 22 is a sectional view of the video display device 1 of Example 1 where each surface is indicated by its surface number. Which surface a symbol Si indicates will be clear from FIG. 22. FIG. 23 is a plan view showing the optical path of the image light at angles of view in the right half of the video display device 1 with respect to the center of the angle of view. Since the video display device 1 is symmetric left to right, the optical path of the image light at angles of view in the left half of the video display device 1 with respect to the center of the angle of view is a mirror image of the optical path shown in FIG. 23 about the plane of symmetry R (principal plane).

The position of each surface Si is identified by surface data consisting of the coordinates (x, y, z) of its vertex and its rotation angle (ADE). The coordinates of the vertex of a surface Si are given, with the vertex taken as the origin of a local rectangular coordinate system (X, Y, Z), in terms of the coordinates (x, y, z) of the origin of the local rectangular coordinate system (X, Y, Z) in a global rectangular coordinate system (x, y, z) (coordinates being given in mm). The inclination of a surface Si is given in terms of the angle of its rotation about its vertex with respect to the X axis (its X rotation). Rotation angles are given in degrees, a counterclockwise direction of rotation as seen from the positive side of the X axis being the positive direction of a rotation angle.

The global rectangular coordinate system (x, y, z) is an absolute coordinate system that coincides with the local rectangular coordinate system (X, Y, Z) of the observation pupil plane (S1). That is, the data of the position of each surface Si are given in the global coordinate system having its origin at the center of the observation pupil plane. On the observation pupil plane, the direction from the observation pupil P toward the eyepiece optical system 14 is the +Z direction, the direction upward from the observation pupil P is the +Y direction, and the direction rightward from the observation pupil P is the +X direction.

The fabrication wavelength (HWL, a normalized wavelength) at the time of the fabrication of the HOE 23 used in Example 1 and the use wavelength are both 532 nm, and the order of the diffraction light used is one. By defining the two light beams used in fabrication, an HOE is uniquely defined. The two beams are defined in terms of the positions of their respective light sources and whether the beams emanating from those light sources are a convergent beam (VIR) or a divergent beam (REA). The coordinates of the first and second light sources (HV1 and HV2) are represented by (HX1, HY1, HZ1) and (HX2, HY2, HZ2) respectively.

In Example 1, the HOE reconstructs wave fronts in a complicated manner. Thus, the HOE is defined by, in addition to the two beams, a phase function φ as well. The phase function φ is, as given below by formula (6), a generating polynomial with respect to the position of the HOE (X, Y), and is expressed by a series of monomials in increasing order of the power, from first to tenth, of the coefficients they include. The construction data includes the coefficients Cj of the phase function φ.

[Formula 6]

$$\phi = C_1 X + C_2 Y + C_3 X^2 + C_4 XY + C_5 Y^2 + \ldots + C_6 Y^{10} \qquad (6)$$

The number j in a coefficient Cj is given by formula (7) below, m and n being the exponents of X and Y.

[Formula 7]

$$j = \{(m+n)^2 + m + 3n\}/2 \qquad (7)$$

On the HOE surface, let the normal vectors of emergent rays be p', q', and r', let the normal vectors of incident rays be p, q, and r, let the wavelength of the reconstructed beam be λ (nm), and let the wavelength of the beam with which the HOE is fabricated be $\lambda_0$ (nm). Then, p', q', and r' are given by formulae (8) below.

[Formula 8]

$$p' = p + \frac{\partial \phi}{\partial X} \cdot \frac{\lambda}{\lambda_0} \qquad (8)$$
$$q' = q + \frac{\partial \phi}{\partial Y} \cdot \frac{\lambda}{\lambda_0}$$
$$r' = r + \sqrt{1 - p'^2 - q'^2}$$

As described above, in Example 1, by use of a light source that emits light of a wavelength of 532 nm corresponding to G (green), a holographic photosensitive material is exposed to form interference fringes corresponding to the phase function of a wavelength of 532 nm. After the interference fringes corresponding to the just mentioned wavelength have been formed, by multiply exposing the holographic photosensitive material sequentially by use of light sources that emit light of other wavelengths R (red) and B (blue), it is possible to make the eyepiece optical system 14 ready for color display. It is also possible to multiply expose holograms corresponding to R, G, and B simultaneously.

Since the HOE surface is symmetric in the left/right direction about the principal plane as the plane of symmetry, in the construction data, only the data for the right half of the HOE surface (the right half of the horizontal angle of view) are given, with the data for the left half of the HOE surface omitted. The HOE surface is composed of a curved surface (cylindrical surface) and a surface tangent to it, the curved surface corresponding to the range of 0≤x<1.8 (in mm) and the tangent surface corresponding to the range of 1.8≤x (in mm).

In the construction data, the shape of a polynomial free-form-curved surface is given by formula (9) below. Z represents the amount of sag (mm) in the Z-axis direction (optical axis direction) at a height of h; c represents the curvature (1/mm) at the vertex; h represents the height, that is, the distance (mm) from the Z axis (optical axis); k represents a conic constant; and c(i, j) represents the coefficients of $x^i y^j$ (free-form-curved-surface coefficients). Throughout the data, it is assumed that the coefficient of any implicit term equals zero, and that "E−n" stands for "×10$^{-n}$".

[Formula 9]

$$Z = \frac{cr^2}{1 + \sqrt{1 - (1+k)c^2 r^2}} + \sum \sum c(i, j) x^i y^j \qquad (9)$$

Example 1

| Surface No. | | Radius of Curvature (on ZX Plane) | Material |
|---|---|---|---|
| S1 | Pupil Plane | INFINITY | Air |
| S2 | Exit Surface | INFINITY | PMMA |
| S3 | HOE Surface (Diffraction-Reflection Surface) | | |
| $(0 \leq x < 1.8)$ | | INFINITY | |

(Definition of Two Beams)

| HV1; | REA | HV2; | VIR | | |
|---|---|---|---|---|---|
| HX1; | 0.000000E+00 | HY1; | 0.000000E+00 | HZ1; | 0.000000E+00 |
| HX2; | 0.000000E+00 | HY2; | 0.000000E+00 | HZ2; | 0.000000E+00 |
| HWL; | 532.00 | | | | |

(Phase Coefficients)

| C2: | −7.4168E−02 | C3: | −2.3621E−02 | C5: | −1.8798E−02 |
|---|---|---|---|---|---|
| C6: | 4.3613E−05 | C7: | 1.9896E−04 | C8: | 4.1132E−05 |
| C9: | −2.0727E−04 | C10: | 9.0149E−06 | C11: | 1.8480E−05 |
| C12: | 9.0575E−06 | C13: | 5.1839E−06 | C14: | −1.0736E−04 |
| C16: | −2.0335E−06 | C18: | −9.1860E−06 | C20: | 9.7667E−06 |
| C21: | −4.7395E−07 | C23: | −4.4856E−07 | C25: | 1.4730E−08 |
| C27: | 1.1068E−05 | C29: | −4.6807E−08 | C31: | 1.1127E−07 |
| C33: | 4.8235E−07 | C35: | 1.9577E−06 | C36: | 5.7999E−09 |
| C38: | 6.1392E−10 | C40: | 1.4491E−08 | C42: | 4.8542E−08 |
| C44: | 1.1186E−07 | | | | |

$(1.8 \leq x)$ −30.178

(Definition of Two Beams)

| HV1; | REA | HV2; | VIR | | |
|---|---|---|---|---|---|
| HX1; | 0.000000E+00 | HY1; | 0.000000E+00 | HZ1; | 0.000000E+00 |
| HX2; | 0.000000E+00 | HY2; | 0.000000E+00 | HZ2; | 0.000000E+00 |
| HWL; | 532.00 | | | | |

(Phase Coefficients)

| C2: | −7.5532E−02 | C3: | −3.6105E−02 | C4: | 3.0316E−02 |
|---|---|---|---|---|---|
| C5: | −1.5494E−02 | C6: | 2.0014E−01 | C7: | −1.9544E−02 |
| C8: | −2.0618E−02 | C9: | 7.3520E−05 | C10: | −3.3787E−01 |
| C11: | 3.0177E−02 | C12: | 1.5741E−02 | C13: | −1.4616E−02 |
| C14: | −7.6801E−04 | C15: | 2.5231E−01 | C16: | −4.9211E−02 |
| C17: | −4.0397E−03 | C18: | 1.3343E−02 | C19: | −2.5653E−03 |
| C20: | −3.1451E−04 | C21: | −9.5392E−02 | C22: | 3.3250E−03 |
| C23: | 4.0593E−04 | C24: | −2.9402E−03 | C25: | 3.2206E−03 |
| C26: | 6.4270E−05 | C27: | −5.1708E−05 | C28: | 1.7998E−02 |
| C29: | −9.7285E−03 | C30: | 1.1719E−05 | C31: | −4.9865E−05 |
| C32: | −7.6876E−04 | C33: | 2.5125E−04 | C34: | 5.0994E−05 |
| C35: | −3.1166E−06 | C36: | −1.3485E−03 | C37: | 1.0436E−03 |
| C38: | −1.9716E−05 | C39: | 1.7133E−05 | C40: | 9.0039E−06 |
| C41: | −5.8132E−05 | C42: | 6.6669E−07 | C43: | 3.0270E−06 |
| C44: | −2.9587E−09 | | | | |

| | S4 | 3rd Reflective Surface | INFINITY | |
|---|---|---|---|---|
| | S5 | 2nd Reflective Surface | INFINITY | |
| | S6 | 1st Reflective Surface | INFINITY | |
| | S7 | Entrance Surface | INFINITY | |
| | S8 | CG SURFACE | INFINITY | BK7 |
| | S9 | Image Plane (Display Surface) | INFINITY | |

| Surface No. | x | y | z | ADE | Reference Surface No. |
|---|---|---|---|---|---|
| S1 | 0 | 0 | 0 | 0 | (Reference Coordinate System) |
| S2 | 0 | −2 | 14 | 0 | S1 |
| S3 | | | | | |
| $(0 \leq x < 1.8)$ | | | | | |
| | 0 | 0 | 17.56 | −29.6 | S1 |
| $(1.8 \leq x)$ | | | | | |
| | 1.8 | 0 | 17.56 | −29.6 | S1 |
| S4 | 0 | 3.5 | 14 | 0 | S1 |
| S5 | 0 | 9 | 18.7 | 0 | S1 |
| S6 | 0 | 19 | 14 | 0 | S1 |
| S7 | 0 | 19.1 | 17.1 | 67.0 | S1 |

-continued

| | | | | | |
|---|---|---|---|---|---|
| S8 | 0 | 21.57 | 19.09 | 43.67 | S1 |
| S9 | 0 | 0 | 0.8 | 0 | S8 |

Observation Pupil: φ3(mm)
Angle of View
Horizontal Direction: 0° < θx < 13.5°
Up/Down Direction: −7.5° < θy < 7.5°

The above-mentioned angle of view in the horizontal direction is that for the purpose of producing the construction data presented above. Since the video display device 1 is symmetric left to right, the actual horizontal angle of view is −13.5°<θx<13.5°.

INDUSTRIAL APPLICABILITY

Video display devices according to the present invention find applications in HMDs and HUDs.

LIST OF REFERENCE SIGNS 1 video display device
2 support member
11 light source
13 display element
14 eyepiece optical system (observation optical system)
21 eyepiece prism
23 HOE (holographic optical element)
23a HOE surface
23L$_1$ ridge line
23L$_2$ ridge line
23p holographic photosensitive material
24 substrate
25 substrate
26 observation optical system
31 first flat face
31a effective region
32 second flat face
32a effective region
33 third flat face
33a effective region
34 fourth flat face
35 fifth flat face
36 sixth flat face
37 seventh flat face
38 eighth flat face
39 ninth flat face
42 exposure mask (aperture stop)
61 curved face
62 tangent flat face
P observation pupil

The invention claimed is:

1. A video display device comprising:
a light source which emits light that has at least one light emission peak wavelength;
a display element which displays an image by modulating the light emitted from the light source, the display element having a rectangular shape having a long side and a short side; and
an observation optical system which directs light from the display element to an observation pupil to allow an observer to observe a virtual image at a position of the observation pupil,
wherein the observation optical system has a volume-phase reflective holographic optical element which diffraction-reflects image light from the display element to direct the image light to the observation pupil,
wherein the holographic optical element includes a surface divided into a plurality of flat faces that are so arranged as to be concave toward the observation pupil,
wherein the plurality of flat faces are contiguous such that every two adjoining flat faces have a common ridge line at a boundary therebetween, and
wherein an image light modulated by the display element is simultaneously incident on all of the plurality of flat faces of the holographic optical element.

2. The video display device according to claim 1, wherein the surface of the holographic optical element is divided into the plurality of flat faces only in one direction.

3. The video display device according to claim 2,
wherein the surface of the holographic optical element is divided into the plurality of flat faces only in a direction corresponding to the long side.

4. The video display device according to claim 2,
wherein the observation optical system includes a substrate on which the holographic optical element is formed, and
wherein the substrate is a plate-form substrate having a constant thickness in a direction perpendicular to the surface of the holographic optical element.

5. The video display device according to claim 4,
wherein the surface of the holographic optical element is symmetric about a symmetry plane and the plurality of flat faces are perpendicular to the symmetry plane, and
wherein the substrate holds the holographic optical element such that order-0 diffraction light produced on the flat faces of the holographic optical element deviates from the optical path toward the observation pupil.

6. The video display device according to claim 1, wherein the surface of the holographic optical element is divided into the plurality of flat faces in two directions.

7. The video display device according to claim 1, wherein each flat face of the holographic optical element includes:
an effective region where the hologram is formed, and
a non-effective region where no hologram is formed, the non-effective regions separating the effective regions from one another and being arranged adjacent the ridge lines between the flat faces.

8. A head-mounted display comprising:
the video display device according to claim 1; and
a support member which supports the video display device in front of an eye of an observer.

9. A head-mounted display comprising the video display device according to claim 1, wherein the holographic optical element in the video display device is held on a substrate arranged within a field of view of an observer.

10. A video display device comprising:
a light source which emits light that has at least one light emission peak wavelength;
a display element which displays an image by modulating the light emitted from the light source, the display element having a rectangular shape having a long side and a short side; and an observation optical system which directs light from the display element to an observation pupil to allow an observer to observe a virtual image at a position of the observation pupil, wherein the observation optical system has a volume-phase reflective holographic optical element which diffraction-reflects image light from the display element to direct the image light to the observation pupil, wherein the holographic optical element includes:
- a curved surface having a curvature only in one direction and concave toward the observation pupil, and
- a flat surface in the direction of the tangent to the curved surface at the end of the curved surface, the flat surface being contiguous with the curved surface, and wherein an image light modulated by the display element is simultaneously incident on the curved surface and the flat surface of the holographic optical element.

11. The video display device according to claim 10, wherein the surface of the holographic optical element is symmetric about a symmetry plane, wherein the flat surface crosses the symmetry plane, and wherein the curved surface is arranged at each side of the tangent surface.

12. The video display device according to claim 10, wherein the surface of the holographic optical element is symmetric about a symmetry plane, wherein the curved surface curves in the symmetry plane, and wherein the flat surface is arranged closer to the display element than the curved surface.

13. The video display device according to claim 12, wherein the observation optical system includes a substrate on which the holographic optical element is formed, and wherein the substrate is a plate-form substrate having a constant thickness in a direction perpendicular to the surface of the holographic optical element.

14. The video display device according to claim 13, wherein the substrate holds the holographic optical element such that order-0 diffraction light produced on the holographic optical element deviates from the optical path toward the observation pupil.

15. The video display device according to claim 10, wherein the curved surface curves in a direction parallel to the long side.

16. The video display device according to claim 10, wherein the curved surface is a cylindrical surface having a constant curvature.

17. The video display device according to claim 10, wherein the curved surface is a surface whose curvature increases the farther away from the flat surface.

* * * * *